United States Patent
Miyashita et al.

(10) Patent No.: US 6,611,493 B1
(45) Date of Patent: Aug. 26, 2003

(54) COMMUNICATION, TRANSMISSION AND RECEIVING METHOD AND APPARATUS USING ORTHOGONAL FREQUENCY DIVISION MULTIPLEXING MODULATION SYSTEM

(75) Inventors: Atsushi Miyashita, Tokorozawa (JP); Toshiyuki Akiyama, Tokorozawa (JP); Seiichi Sano, Higashiyamato (JP); Hiroyuki Takesue, Kodaira (JP); Tatuhiro Nakada, Kodaira (JP); Nobuo Tsukamoto, Akishima (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/236,601

(22) Filed: Jan. 26, 1999

(30) Foreign Application Priority Data

Jan. 27, 1998 (JP) .......................................... 10-014033
Jan. 27, 1998 (JP) .......................................... 10-014034

(51) Int. Cl.[7] ................................................ H04J 11/00
(52) U.S. Cl. ...................................... 370/208; 370/210
(58) Field of Search ................................ 370/208, 204, 370/205, 206, 207, 212, 213, 215, 668, 210, 252, 543, 260, 244, 226, 364, 324, 362, 371, 261, 482, 480

(56) References Cited

U.S. PATENT DOCUMENTS

| | | | | | |
|---|---|---|---|---|---|
| 5,506,836 A | * | 4/1996 | Ikeda | ......................... | 370/203 |
| 5,657,313 A | * | 8/1997 | Takahashi | .................... | 370/491 |
| 5,675,572 A | * | 10/1997 | Hidejima | ..................... | 370/206 |
| 5,694,389 A | * | 12/1997 | Seki | ............................ | 370/208 |
| 5,771,224 A | * | 6/1998 | Seki | ............................ | 370/206 |
| 5,774,450 A | * | 6/1998 | Harada | ........................ | 370/206 |
| 6,009,073 A | * | 12/1999 | Kaneko | ........................ | 370/203 |
| 6,021,110 A | * | 2/2000 | McGibney | ................... | 370/208 |
| 6,091,702 A | * | 7/2000 | Saiki | ........................... | 370/203 |
| 6,175,550 B1 | * | 1/2001 | Van Nee | ...................... | 370/206 |
| 6,304,545 B1 | * | 10/2001 | Armbruster | ................. | 370/210 |

FOREIGN PATENT DOCUMENTS

| EP | 869647 | 10/1998 |
|---|---|---|
| WO | 9411961 | 5/1994 |

* cited by examiner

Primary Examiner—Douglas Olms
Assistant Examiner—Ricardo M. Pizarro
(74) Attorney, Agent, or Firm—Antonelli, Terry, Stout & Kraus, LLP

(57) ABSTRACT

A communication method in an orthogonal frequency division multiplexing modulation communication system includes a transmission apparatus in which a frequency bandwidth of a signal modulated in accordance with an orthogonal frequency division multiplexing modulation system is changed and the modulated signal is transmitted and a receiving apparatus in which the modulated signal is received and a frequency bandwidth for demodulation of the received signal is changed to follow the change of the frequency bandwidth of the modulated signal.

34 Claims, 25 Drawing Sheets

COMMUNICATION, TRANSMISSION AND RECEIVING METHOD AND APPARATUS USING ORTHOGONAL FREQUENCY DIVISION MULTIPLEXING MODULATION SYSTEM

BACKGROUND OF THE INVENTION

The present invention relates to a transmission bandwidth changing method and a digital transmission apparatus for an orthogonal frequency division multiplexing modulation system.

In recent years, in Europe, the United States of America and Japan, the digitalization of the television broadcasting is being studied, while the orthogonal frequency division multiplexing (OFDM) modulation system is promising as the modulation system of the digitalization.

The OFDM modulation system is of a kind of multi-carrier modulation system and a multiplicity of digital modulation waves are added to one another to be transmitted. The quadrature phase shift keying (QPSK) system, the quadrature amplitude modulation system or the like is used as the modulation system of carriers thereof.

An OFDM signal is expressed by equations as follows:

First, when a QPSK signal of each carrier is $\alpha_k(t)$, the signal is expressed by the following equation (1):

$$\alpha_k(t) = a_k(t) \times \cos(2\pi k f t) + b_k(t) \times \sin(2\pi k f t) \quad (1)$$

where k represents a number of the carrier, and $a_k(t)$ and $b_k(t)$ represent data of the k-th carrier and have a value of [−1] or [1].

Next, when the number of carriers are N, the OFDM signal is a composite signal of N carriers and when the composite signal is $\beta_k(t)$, the signal can be expressed by the following equation (2):

$$\beta_k(t) = \Sigma \alpha_k(t) \quad (2)$$

where k assumes 1 to N, that is, k=1 to N (which is an integer equal to or larger than 1).

The OFDM signal is constituted by a time-axis base signal defined by the equation (2). For example, 32 samples of guard interval data are added to 1024 effective samples of data to constitute one symbol of 1056 samples and 396 sets of symbols are added to 4 sets of synchronizing symbols to constitute a series of signals of 400 symbols in total. The series of signals of 400 symbols is named a frame. The OFDM signal is constituted by frames generated repeatedly.

The digital communication technique using the OFDM system is described in, for example, a paper on "A Study on Field Pickup Unit using OFDM Modulation Scheme", Shigeki Moriyama et al., ITE Technical Report Vol. 19, No. 38, pp. 7–17, August 1955 and JP-A-7-30513. In the conventional OFDM system, a frequency bandwidth of a signal to be transmitted is a fixed value previously assigned to a communication system and is not changed.

SUMMARY OF THE INVENTION

According to the present invention, there is provided an OFDM system having a changeable frequency bandwidth for a transmission signal. When the bandwidth is changed in the transmission side, a demodulation bandwidth for a received signal is changed to follow the changed bandwidth of the transmission signal in a receiving side. The transmission frequency bandwidth in the OFDM system is expressed by a product of an interval of frequency between adjacent carriers and the number of total carriers. According to an embodiment of the present invention, the frequency bandwidth is changed by changing the number of carriers or by changing the interval between carriers.

In the digital communication system utilizing the present invention, the frequency bandwidth assigned for transmission of a digital signal can be employed effectively. The bandwidth can be broadened in the communication requiring a wide bandwidth as an image signal and the bandwidth can be narrowed in the transmission of a signal having a relatively narrow bandwidth as an audio signal and a control signal. Further, when the occupancy frequency bandwidth required for a signal to be transmitted is narrower than the assigned frequency bandwidth, the assigned bandwidth is divided into a plurality of channels each having a narrower bandwidth, so that different data can be transmitted by means of the plurality of channels. Bidirectional communication can be attained by means of the plurality of channels. In addition, occupied bandwidth of each channel can be changed or shifted in accordance with the amount of transmitted data on the way to thereby change the quality of the transmission signal.

DESCRIPTION OF THE PREFERRED EMBODIMENTS

Embodiments of the present invention are now described in detail with reference to the accompanying drawings.

Figure 14:
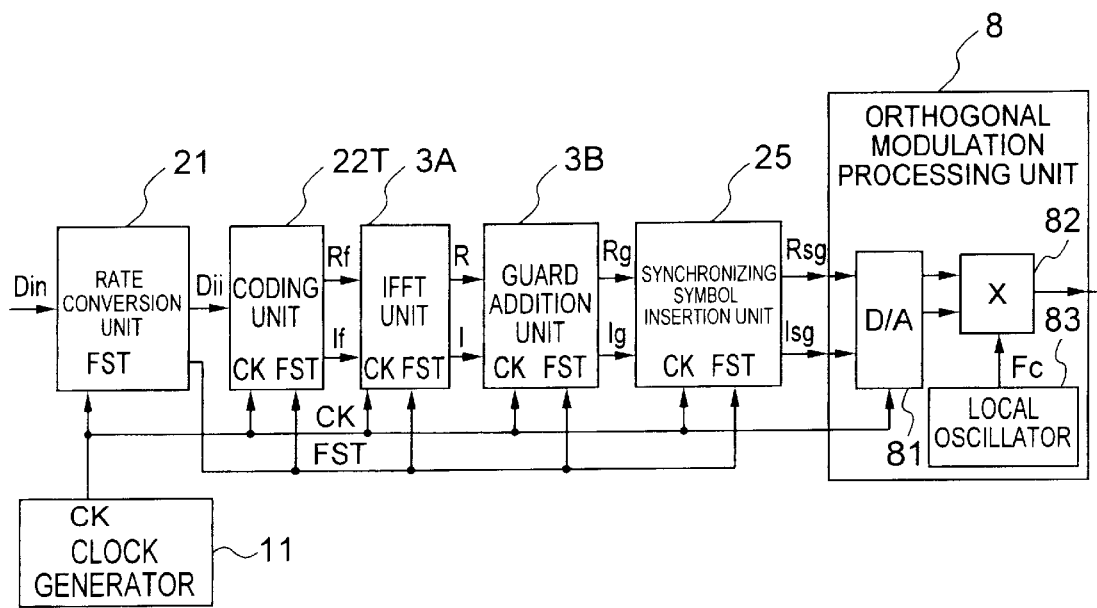
FIG. 14 is a block diagram schematically illustrating the overall configuration of the OFDM communication system to which the system of the present invention can be applied.
Figure 14:
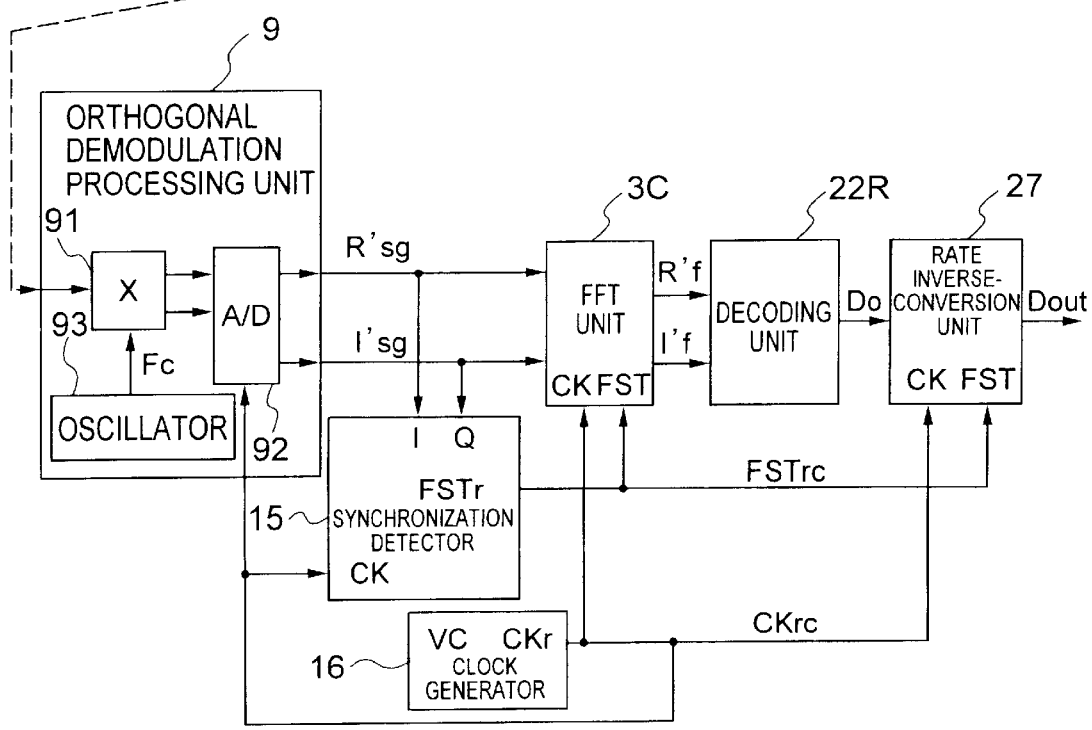
Figure 15A:
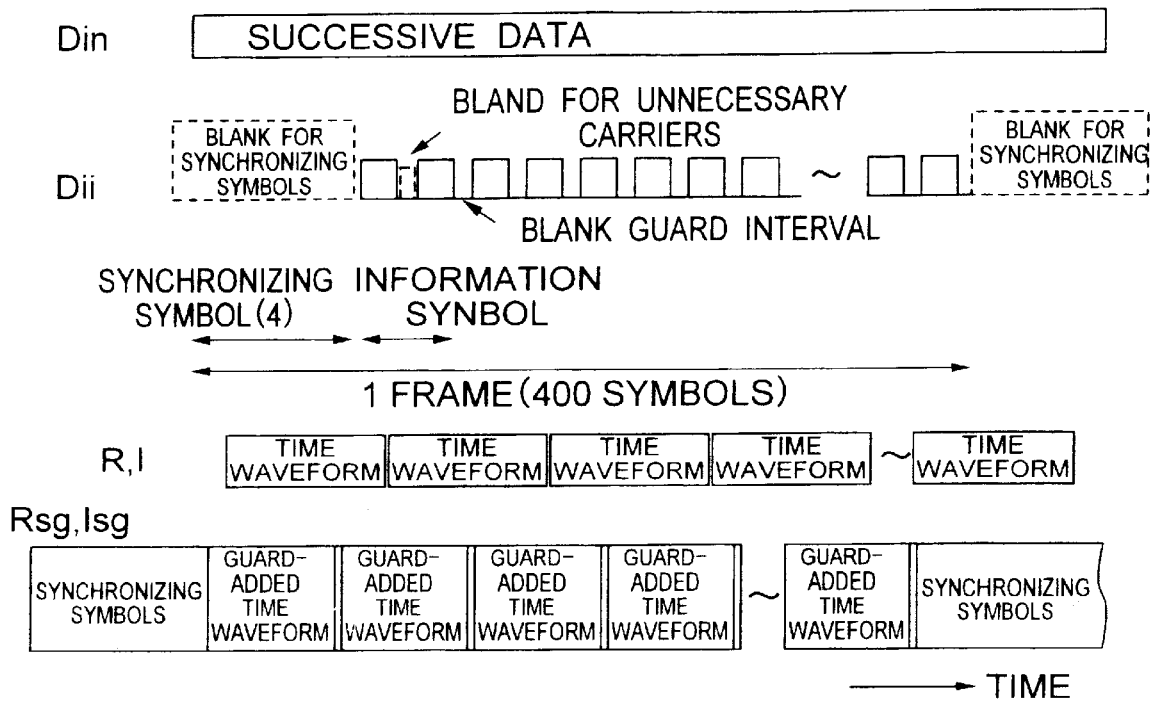
FIGS. 15A and 15B are a timing chart showing waveforms at various portions of the OFDM communication system and a waveform diagram showing a frame structure, respectively.
Figure 15B:
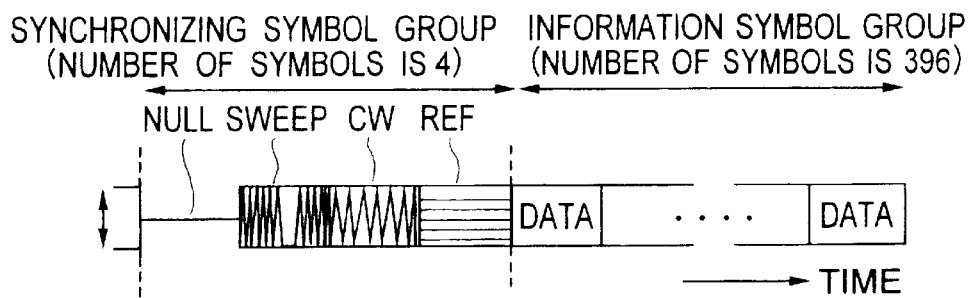

FIG. 14 is a block diagram schematically illustrating a digital communication system using the OFDM modulation system to which the technique of the present invention can be applied, and FIGS. 15A and 15B are timing charts of signals at various portions of the system.

Data Din successively inputted are rate-converted by a rate conversion unit 21, which produces data Dii during the period excluding a four-symbol period corresponding to a synchronizing symbol period described later and the period excluding blanks for unnecessary carriers corresponding to the period of 344-th to 679-th samples in each information symbol at intervals of a frame period composed of 400 symbols.

Further, the rate conversion unit 21 supplies an FST signal indicating the beginning of the synchronizing symbol period to other units every 400 symbols corresponding to the frame period.

A coding unit 22T codes the input data to produce coded data Rf and If mapped in two axes of I and Q.

An IFFT (Inverse Fast Fourier Transform) unit 3A regards the coded data Rf and If as frequency components and converts the data into time-axis signals R and I including 1024 samples.

A guard addition unit 3B adds waveforms at the beginning period of the signals R and I including 1024 samples, for example waveforms of the first 32 samples, to the end of the 1024 samples and produces time waveform signals Rg and Ig of 1056 samples in total.

A synchronizing symbol insertion unit 25 prepares signals Rsg and Isg having the synchronizing symbols inserted therein and which are stored previously in a memory and constituted by, for example, 4 symbols and outputs the signals Rsg and Isg at intervals of m information symbols.

The signals are orthogonally modulated by an orthogonal modulation processing unit 8 to be an OFDM modulation wave signal having a frame structure as shown in FIG. 15B and the OFDM modulation wave signal is transmitted from the transmission side to the reception side.

A clock CK generated by a clock oscillator 11 is supplied to each of the units.

The transmitted OFDM modulation wave signal is orthogonally demodulated to an OFDM signal of baseband by an orthogonal demodulation processing unit 9 at the reception side to be outputted as time-axis signals R'sg and I'sg.

The signals R'sg and I'sg are supplied to a synchronization detector 15, which detects the synchronizing symbol group and produces an FST'r pulse indicating the frame period to be supplied to each unit.

Further, the time-axis signals R'sg and I'sg are supplied to an FFT unit 3C to be converted from the time waveform signals into frequency component signals R'f and I'f.

The signals R'f and I'f are decoded by a decoding unit 22R, which produces a signal D'o. The signal D'o is converted into a successive data signal Dout by a rate inverse-conversion unit 27 to be outputted.

Detailed configuration and operation of each unit are now described.

Figure 16:
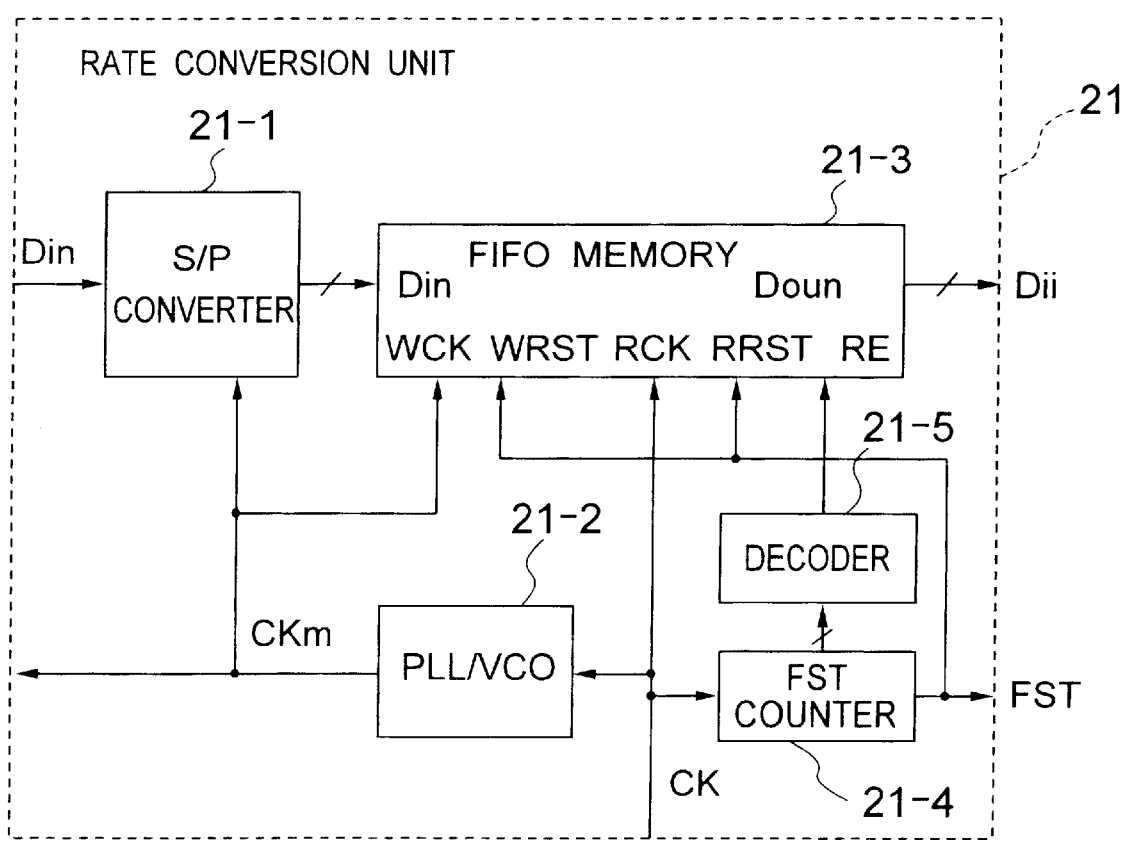
FIG. 16 is a block diagram schematically illustrating a rate conversion unit used in the communication system illustrated in FIG. 14.

First of all, an example of the rate conversion unit 21 is described with reference to FIG. 16.

The clock CK supplied to the rate conversion unit 21 is inputted to a PLL/VCO 21-2, which produces a clock CKm having a frequency equal to N/G times of the clock CK. The symbol G is a control constant. The relation of the output clock frequency CK of the clock generator 11, the clock frequency CKm in the rate conversion unit 21 and the constant G is expressed by the following equation (3):

$$CKm = CK \cdot G \quad (3)$$
$$= CK \cdot N \cdot \text{(number of data symbols)} \cdot \text{(number of modulation bits)}/\text{(number of effective samples + number of guard samples)} \cdot \text{(number of frame symbols)}$$

Further, the clock CK is also inputted to an FST counter 21-4, which produces an FST pulse which is a frame reference for processing at the transmission side. The FST pulse is supplied to a WRST terminal and an RRST terminal of an FIFO memory 21-3 to function as a reference for reset in writing and reading operations.

Reading-out of data from the FIFO memory 21-3 is performed in accordance with a level at an RE terminal in synchronism with the clock supplied to an RCK terminal thereof. A pulse supplied to the RE terminal is outputted from a decoder 21-5.

The successively inputted data Din is converted into a parallel signal by a serial-to-parallel (S/P) converter 21-1 to be inputted to the FIFO memory 21-3, which produces the data signal Dii (FIG. 15A) having the blank periods as described above.

Figure 17:
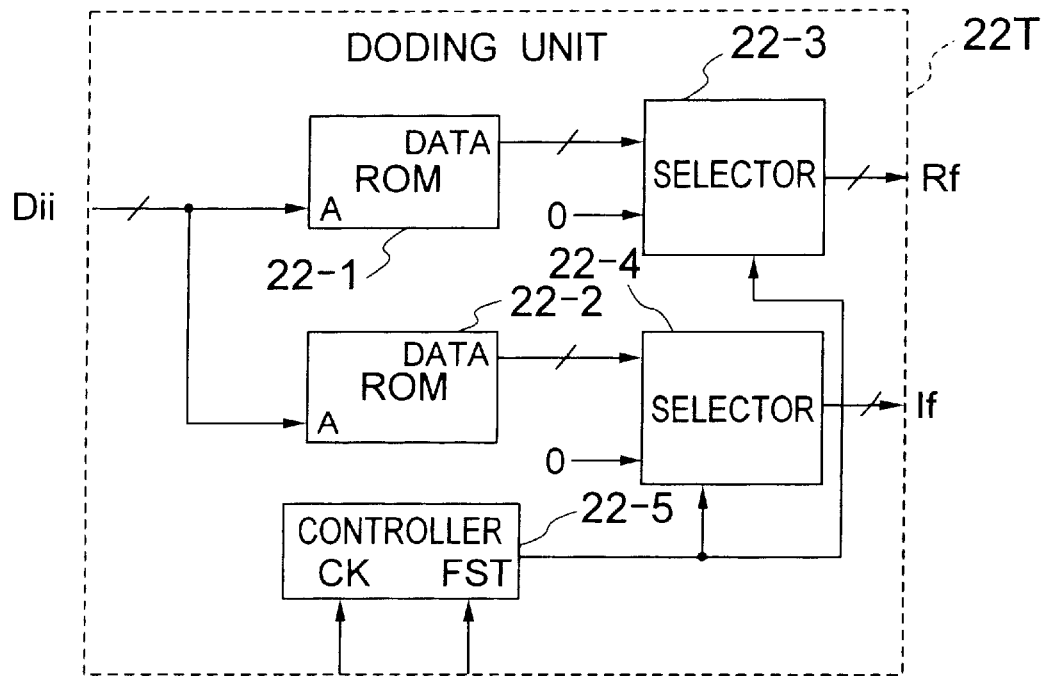
FIG. 17 is a block diagram schematically illustrating a coding unit used in the communication system illustrated in FIG. 14.

An example of the coding unit 22T is now described with reference to FIG. 17.

The output signal Dii produced by the rate conversion 21 is supplied to mapping ROMs 22-1 and 22-2 to be converted into signals at predetermined points of I and Q axes. The signals during the periods corresponding to the unnecessary carriers shown in FIG. 15A are substituted with "0" in selectors 22-3 and 22-4, so that the signals Rf and If are produced. The selectors 22-3 and 22-4 are controlled by a controller 22-5 having the timing defined on the basis of the clock CK and the FST pulse.

Figure 18:
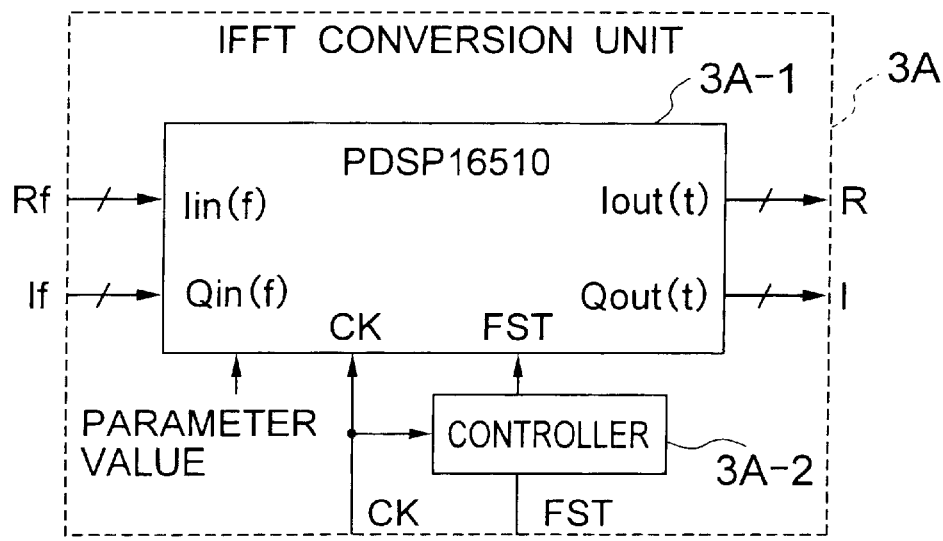
FIG. 18 is a block diagram schematically illustrating an IFFT unit used in the communication system illustrated in FIG. 14.

An example of the IFFT transform unit 3A is now described with reference to FIG. 18.

The input signals Rf and If are converted into the time waveform signals R and I on the basis of the signal having the symbol period including the guard period by a controller 3A-2 having the timing determined by the clock CK and the FST pulse. The IFFT transform unit can be realized by using PDSP 16510 of Plessy Company, for example.

Figure 19:
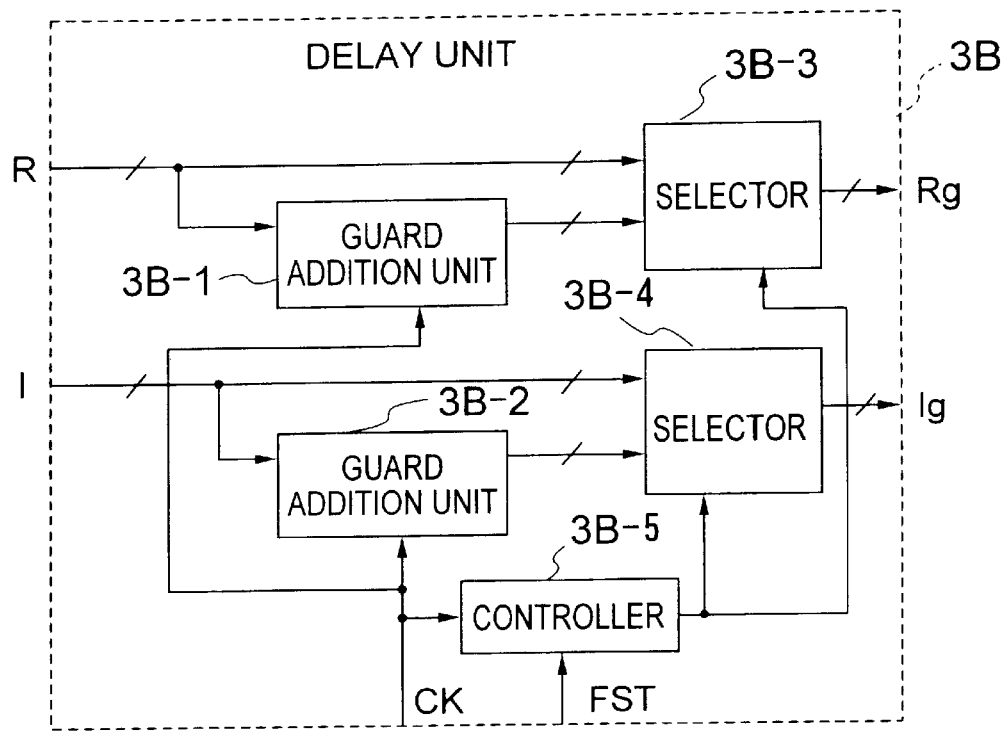
FIG. 19 is a block diagram schematically illustrating a guard addition unit used in the communication system illustrated in FIG. 14.

An example of the guard addition unit 3B is now described with reference to FIG. 19.

The input signals R and I are supplied to delay units 3B-1 and 3B-2 for delaying signals by 1024 samples and selectors 3B-3 and 3B-4. The selectors 3B-3 and 3B-4 select undelayed signals R and I for 1st to 1024th samples and signals delayed by 1024 samples in the delay units 3B-1 and 3B-2 for 1025th to 1056th samples to be produced.

Consequently, the output signals Rg and Ig having 1056 samples for one symbol include the 1025th to 1056th samples to which time waveforms from 1 to 32 samples are added. The selectors 3B-3 and 3B-4 are controlled by a controller 3B-5 having the timing determined by the clock CK and the FST pulse.

Figure 20:
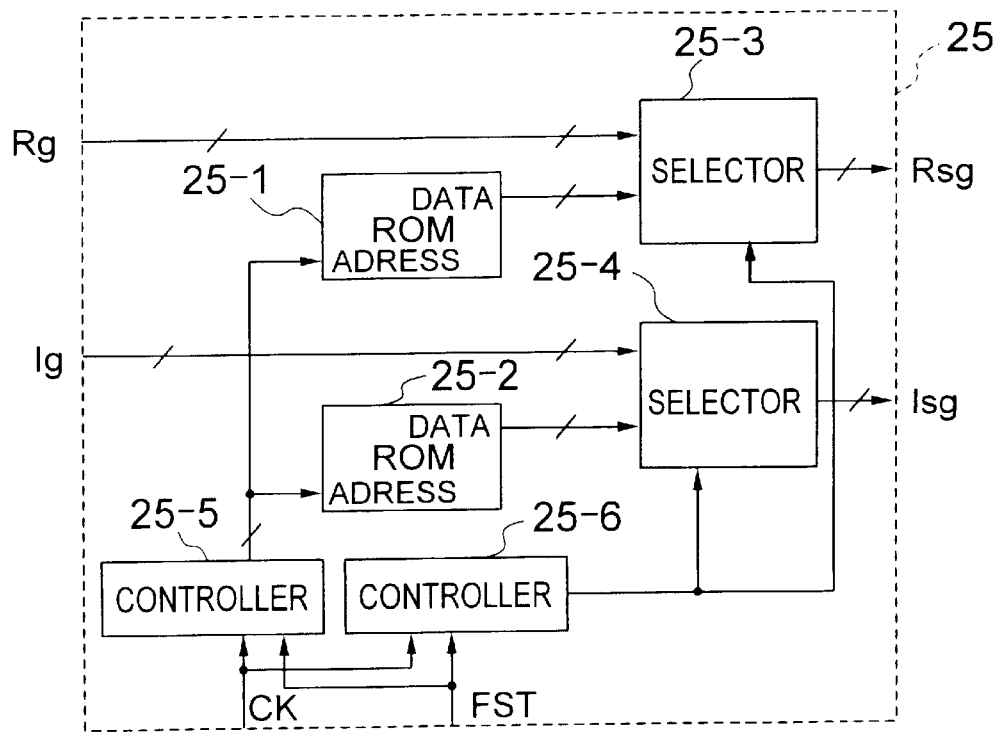
FIG. 20 is a block diagram schematically illustrating a synchronizing symbol insertion unit used in the communication system illustrated in FIG. 14.

An example of the synchronizing symbol insertion unit 25 is now described with reference to FIG. 20.

ROMs 25-1 and 25-2 controlled by a controller 25-5 having the timing determined by the clock CK and the FST pulse produce the synchronizing symbol signals at the timing according to the FST pulse.

Similarly, selectors 25-3 and 25-4 controlled by a controller having the timing determined by the clock CK and the FST pulse select the synchronizing symbol signals from the ROMs 25-1 and 25-2 only during four symbol periods, which are no-signal periods at the current stage, of the guard-added time signals Rg and Ig produced by the guard addition unit 3B. Consequently, the synchronizing symbol insertion unit 25 produces the time waveform signals Rsg and Isg having the synchronizing symbol signal inserted therein as shown in FIG. 15A.

A NULL symbol shown in FIG. 15B is used to find the presence of the synchronizing symbol group roughly and any signal is not produced during this symbol period.

Further, a SWEEP symbol is to detect a change point of each symbol exactly and is constituted by a waveform having the frequency varying from a lower limit frequency to an upper limit frequency of the transmission bandwidth during one symbol period.

A real number part signal Rsg and an imaginary number part signal Isg of the time waveform signals are converted into analog signals in a D/A converter 81 of the orthogonal modulation processing unit 8 and an orthogonal modulator 82 orthogonally modulates the analog signals for the real number part signal with a carrier signal having a frequency fc produced by a local oscillator 83 and the analog signals for the imaginary number part signal with a 90° phase-shifted signal of the carrier signal having the frequency fc produced by the local oscillator 83 and combines both the signals to produce the OFDM signal.

Configuration and operation of the receiving side are now described.

First, the signal transmitted as described above and having the frame structure is inputted to the orthogonal demodulation processing unit 9. The unit 9 orthogonally demodulates the input signal with a carrier signal from a voltage-controlled oscillator 93 to take out the real number part signal and orthogonally demodulates the input signal with the 90° phase-shifted carrier signal to take out the imaginary number part signal. The demodulated analog signals for the real number part signal and the imaginary number part signal are converted into digital signals in an A/D converter 92.

Figure 21:
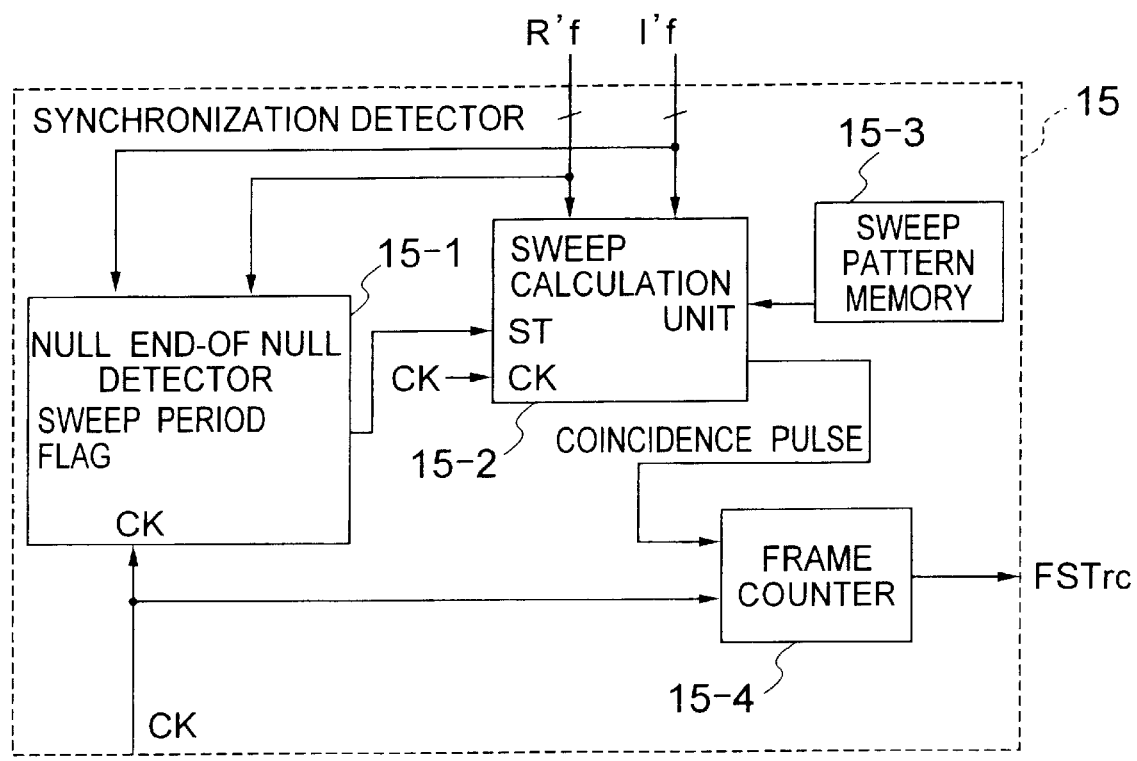
FIG. 21 is a block diagram schematically illustrating a synchronization detection unit used in the communication system illustrated in FIG. 14.

An example of the synchronization detector 15 is now described with reference to FIG. 21.

The orthogonally demodulated digital signals R'sg and I'sg are inputted to an end-of-NULL detector 15-1 and a SWEEP calculation unit 15-2.

The end-of-NULL detector 15-1 detects the NULL symbol having the no-signal period from the symbol group having the frame structure to detect a rough position of the synchronizing symbol, so that the detector 15-1 presumes the beginning time of the SWEEP symbol by a timer circuit not shown on the basis of the NULL completion time to produce a SWEEP period flag pulse.

The SWEEP calculation unit 15-2 searches for an exact change timing of each symbol in accordance with the SWEEP symbol subsequent to the NULL symbol with reference to the SWEEP period flag pulse. More particularly, a pattern of the SWEEP symbol is previously stored in a memory 15-3 and the inputted OFDM signal are correlated with the signal stored in the memory, so that when the signal pattern stored in the memory and the pattern of the inputted OFDM signal are coincident, a coincidence pulse is inputted to a reset terminal of a frame counter 15-4.

When a count of the frame counter 15-4 reaches a value constituting the frame period, for example, 422400 (=1056×

400), the frame counter resets the count to zero and produces an FSTr pulse indicating the beginning time of the frame. At the same time, the frame counter starts the counting again.

Thereafter, the frame counter produces the FSTr pulse at intervals of a predetermined count, that is, every beginning point of the frame to thereby indicate the beginning time of the frame. In the receiving side, the FSTr pulse is used as the start timing in the FFT unit 3C, the decoding unit 22R and the rate inverse-conversion unit 27.

The FFC unit 3C partitions the symbols on the basis of the FSTr pulse and performs the Fourier Transform to thereby attain the OFDM demodulation so that the FFC unit 3C produces the frequency component signals R'f and I'f. The decoding unit 22R identifies the signals R'f and I'f by means of an ROM table method, for example, to calculate the decoded signal D'o.

The rate inverse-conversion unit 27 determines the operation timing in accordance with the clock CKr and FSTr pulses and has the configuration obtained by inverting the configuration of the rate conversion unit 21.

The bandwidth of the OFDM signal to be transmitted is twice the bandwidth of the baseband signals Rsg and Isg. The bandwidth of the baseband signals Rsg and Isg is determined depending on data corresponding to the carrier inputted to the IFFT unit 3A.

Operation of the IFFT unit 3A is now described with reference to FIG. 22. The signal Rf of the frequency component is successively inputted in synchronism with the clock of a period 1/S.

A first data f0 determines an amplitude level of a carrier 0 which is a DC component. A second data f1 determines an amplitude level of a carrier 1 of a period 1024/S. A third data f2 determines an amplitude level of a carrier 2 of a period 512/S.

A maximum frequency component thus inputted determines a maximum frequency of the time waveforms, that is, the bandwidth prepared by the IFFT transform.

The carriers prepared by subjecting individually determined amplitudes to the transform are all added to prepare the time waveform signal R.

The time waveform signal R is constituted by data of 1024 samples in total and each sample data is produced in synchronism with the clock of the period 1/S. That is, the frequency of the carrier 1 is 1024 times the input clock frequency.

The carrier interval is determined by the number of FFT samples and the FFT clock.

Carrier Interval=Number of FFT Samples×1/(FFT Clock Frequency)

Further, the bandwidth is determined by the carrier interval and the number of carriers.

Bandwidth=Carrier Interval×Number of Carriers (4)

The digital communication system of the OFDM modulation system described with reference to the accompanying drawings can utilize the system and the method disclosed in co-pending U.S. patent application Ser. No. 09/098,346 filed on Jun. 17, 1998 and Ser. No. 09/099,390 filed on Jun. 18, 1988 filed by inventors including the inventor of the present invention. The disclosure of these co-pending applications are incorporated herein by reference.

In the conventional digital signal transmission apparatus of the OFDM modulation system, the number of carriers is fixed and according the bandwidth is fixed.

Further, in the conventional transmission apparatus, when the transmission bandwidth is to be changed, there are many portions which must be changed in both of the transmission side and the receiving side. In addition, since the receiving side cannot follow the change of the bandwidth performed at the transmission side, the transmission bandwidth cannot be changed easily and in a moment.

According to the first embodiment of the present invention, the above drawbacks in the prior art can be removed and there can attain a transmission system which can change the bandwidth easily and perform exact bandwidth changing processing.

According to another embodiment of the present invention, the state of the transmission bandwidth is detected in the receiving side and the bandwidth mode in the receiving side is automatically changed.

The embodiment of the present invention described later comprises means for changing the following functional portions in interlocked relationship with one another in order to provide the bandwidth changeable transmission system by means of changing the number of carriers.

1) Function for changing an effective data output period and a frequency division ratio of the PLL/VCO 1-2 in the rate conversion unit 1;
2) Function for correcting a symbol amplitude and changing the period of the controller 2-5 for substituting the carrier amplitude with "0" in the coding unit 2T;
3) Function for changing the upper limit frequency and the lower limit frequency data of the ROMs 5-1 and 5-2 for generation of the SWEEP symbol in the synchronizing symbol insertion unit 5;
4) Function for changing the SWEEP symbol pattern stored in the memory included in the SWEEP calculation unit 4-2 in the synchronization detector 4;
5) Function for changing to shorten a period for decoding in the decoding unit 2R; and
6) Function for changing the frequency division ratio of the PLL/VCO and the period for taking in the effective data in the rate inverse-conversion unit 7.

Further, in another embodiment of the present invention, there is provided a data confirmation unit 18 supplied with data to be decoded and a controller for determining the state on the receiving side is controlled in accordance with an output of the data confirmation unit.

Namely, in the embodiment, the rate conversion unit 1 increases the frequency division ratio by N/G times and reduces the data taking-in amount per unit time by N/G times. Further, the effective data output period is reduced by N/G times. More particularly, after A (e.g. 688) symbol data have been outputted, the outputting is stopped temporarily and then A symbol data equal to a sum of (A+1)-th to 2A-th symbol data are outputted after the symbol period. This operation is made repeatedly.

The coding unit 2T prepares A sets of inputted data symbols and then produces an amplitude value "0" during the period that the rate conversion unit 1 is stopped temporarily. Further, in order to correct the reduced time waveform power prepared by the IFFT unit and caused by reduction by N/G times of the frequency component, the amplitude of the prepared symbol is increased to $1/(N/G)^2$. If the correction is not made, the electric power amount per symbol is changed when the synchronizing symbol group is compared with the data symbol group.

Consequently, when a signal passes through a digital processing unit having insufficient dynamic range or an analog unit left in the transmission system, the performance is deteriorated by a deteriorated S/N due to reduction of a signal level or clip. The deterioration of the performance can be avoided by the above-mentioned correction of the symbol amplitude.

The synchronizing symbol insertion unit 5 narrows the upper limit frequency and the lower limit frequency of data for the SWEEP symbol by N/G times in accordance with change of the bandwidth.

The SWEEP symbol pattern stored in the memory included in the SWEEP calculation unit 4-2 of the synchronization detector 4 is changed to narrow the upper limit frequency and the lower limit frequency by NIG times. Further, the period for decoding in the decoding unit 2R is shortened by N/G times to be A.

The effective data taking-in period of the rate inverse-conversion unit 7 is reduced by N/G times. More particularly, after A symbol data have been taken in, the taking-in operation is stopped temporarily and then A symbol data equal to a sum of (A+1)-th to 2A-th symbol data are taken in after the symbol period. This operation is made repeatedly.

Further, a frequency division ratio of the PLL/VCO is increased by G/N times and the output data amount per unit time is reduced by N/G times.

The above changing operation can effect realization of the taking-in output clock rate corresponding to the transmission rate varied due to change of the bandwidth, prevention of the output level variation due to change of the number of carriers and maintenance of the synchronization accuracy due to use of the SWEEP symbol using the bandwidth changing from end to end throughout.

Further, operation of another embodiment of the present invention is now described.

Figure 22:
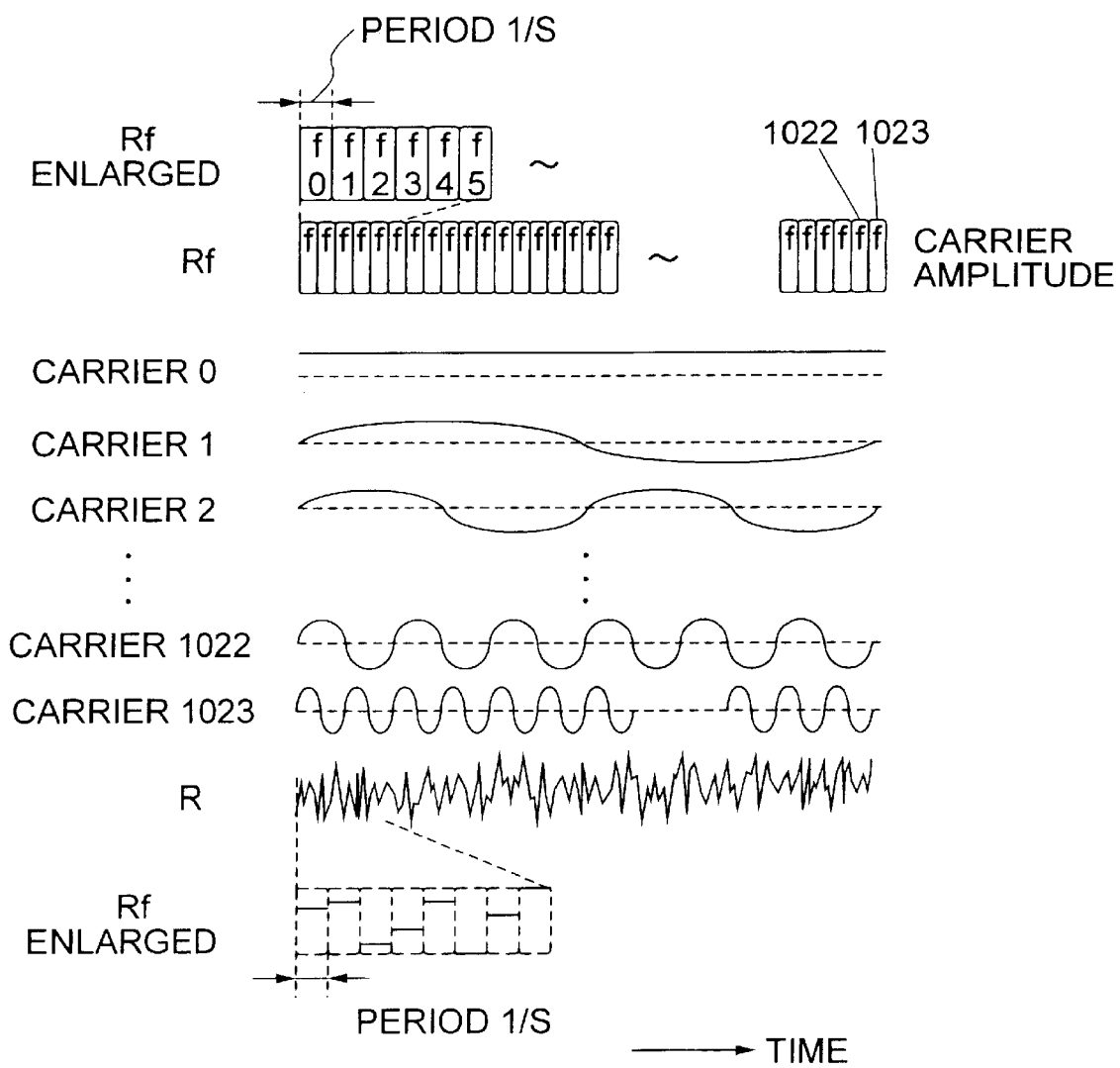
FIG. 22 is a diagram showing operation of an IFFT transform unit used in the communication system illustrated in FIG. 14.

Components of all the bandwidths to be subjected to the FFT in the frequency components subjected to the FFT transform are arranged to be outputted successively as shown by Rf of FIG. 22.

Accordingly, the output arrangement of components having the output level equal to zero can be confirmed to thereby decide the number of carriers prepared on the transmission side. A mode for decoding or inverse-conversion processing of the data rate is determined on the basis of the result of the decision.

Figure 1:
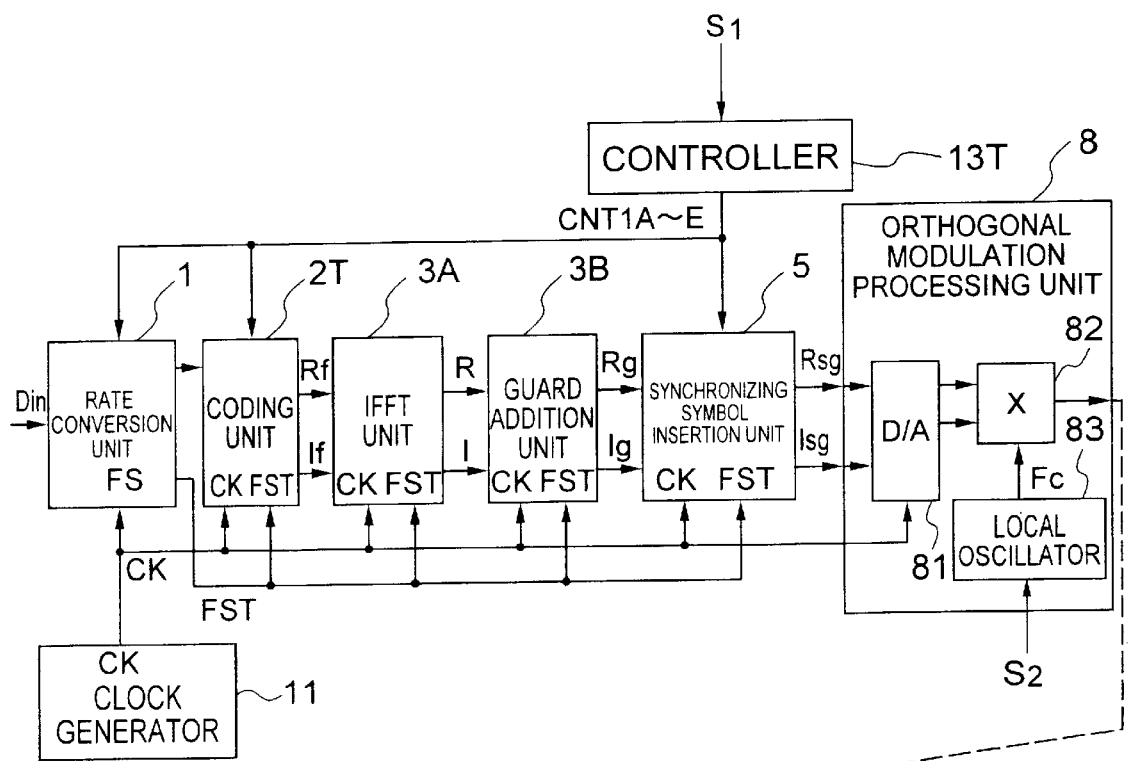
FIG. 1 is a block diagram schematically illustrating the overall configuration of an OFDM communication system according to an embodiment of the present invention.
Figure 1:
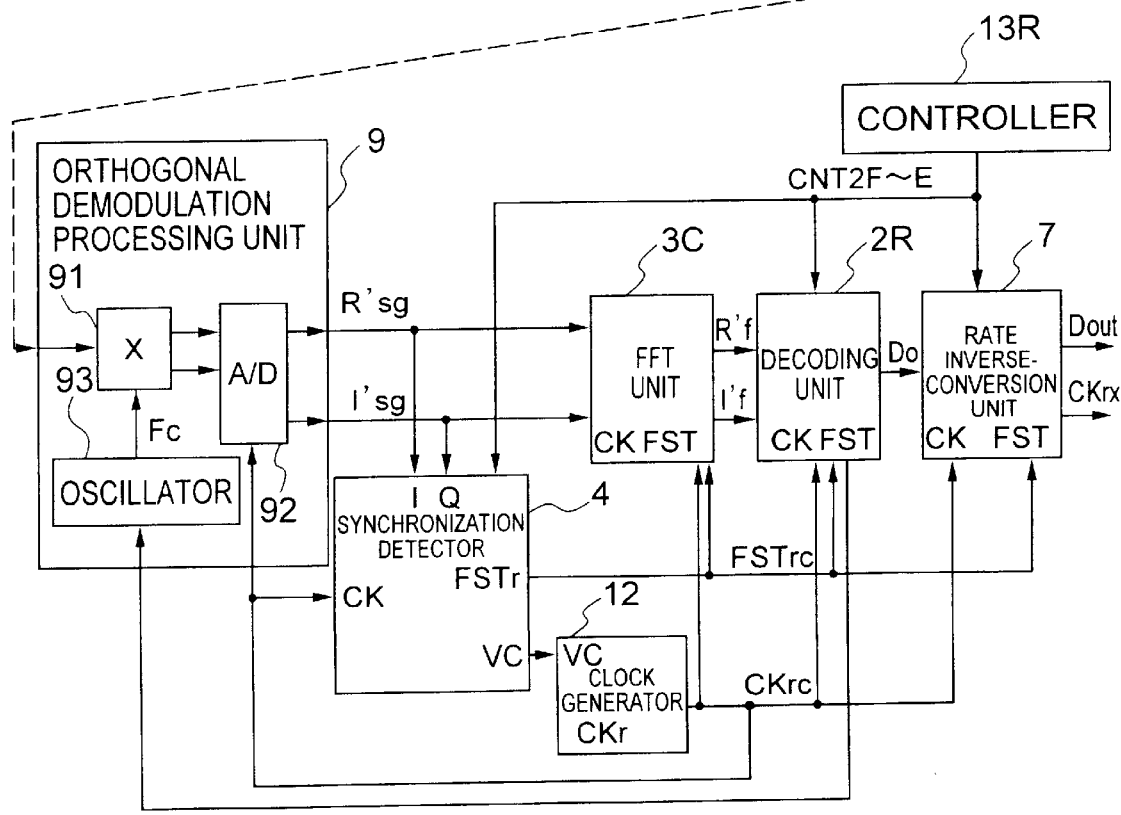

A bandwidth changeable transmission system in which the number of carriers is changed according to an embodiment of the present invention is now described with reference to FIG. 1 schematically illustrating the overall configuration thereof in a block diagram.

In the transmission side, an output terminal of a clock generator 11 is connected to respective clock terminals CK of a rate conversion unit 1, a coding unit 2T, an IFFT unit 3A, a guard addition unit 3B, a synchronizing symbol insertion unit 5 and an orthogonal modulation processing unit 8. Change control signals CNT1A to CNT1E from a controller 13T are supplied to control input terminals of the rate conversion unit 1, the coding unit 2T and the synchronizing symbol insertion unit 5, respectively, The controller 13T designates respective operation modes of the rate conversion unit 1, the coding unit 2T and the synchronizing symbol insertion unit 5.

In the receiving side, an output VC of a synchronization detector 4 is connected to a terminal VC of a voltage controlled clock generator 12. An output FSTr of the synchronization detector 4 is connected to respective FST terminals of an FFT unit 3C and a rate inverse-conversion unit 7. An output CKr of the voltage controlled clock generator 12 is connected to respective clock terminals of the FFT unit 3C, the rate inverse-conversion unit 7, an orthogonal demodulation processing unit 9 and the synchronization detector 4. Change control signals CNT2F to CNT2H from a controller 13R are supplied to the rate inverse-conversion unit 7, a decoding unit 2R and the synchronization detector 4.

Figure 11:
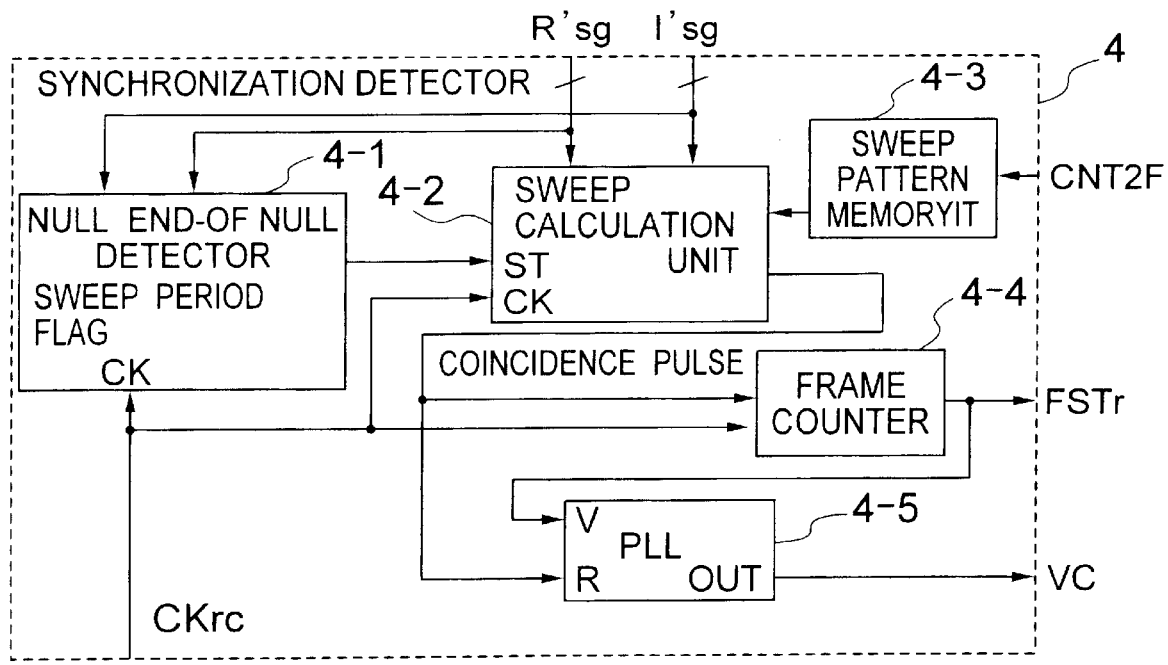
FIG. 11 is a block diagram schematically illustrating synchronization detection units 4 and 15 used in the system according to the embodiment of the present invention.

A definite configuration of the synchronization detector 4 used in the present invention is now described with reference to FIG. 11.

Input signals R'sg and I'sg are supplied to an end-of-NULL detector 4-1 and a SWEEP calculation unit 4-2. A SWEEP period flag pulse produced by the end-of-NULL detector 4-1 is supplied to an ST terminal of the SWEEP calculation unit 4-2. Respective CK terminals of the end-of-NULL detector 4-1, the SWEEP calculation unit 4-2 and a frame counter 4-4 are supplied with a clock CKr. A coincidence pulse produced by the SWEEP calculation unit 4-2 is inputted to an R terminal of a PLL 4-5.

Further, an output FSTr of the frame counter 4-4 which counts 1056×400 clocks CKr is supplied to subsequent circuits connected thereto and a V terminal of the PLL 4-5. The PLL 4-5 produces a signal VC having a voltage varying depending on a phase of a signal inputted to the V terminal and an R terminal thereof.

The voltage controlled clock generator 12 increases or decreases the frequency of the clock CKrc produced thereby in accordance with a magnitude of a voltage of the signal VC supplied from the synchronization detector 4.

Figure 8:
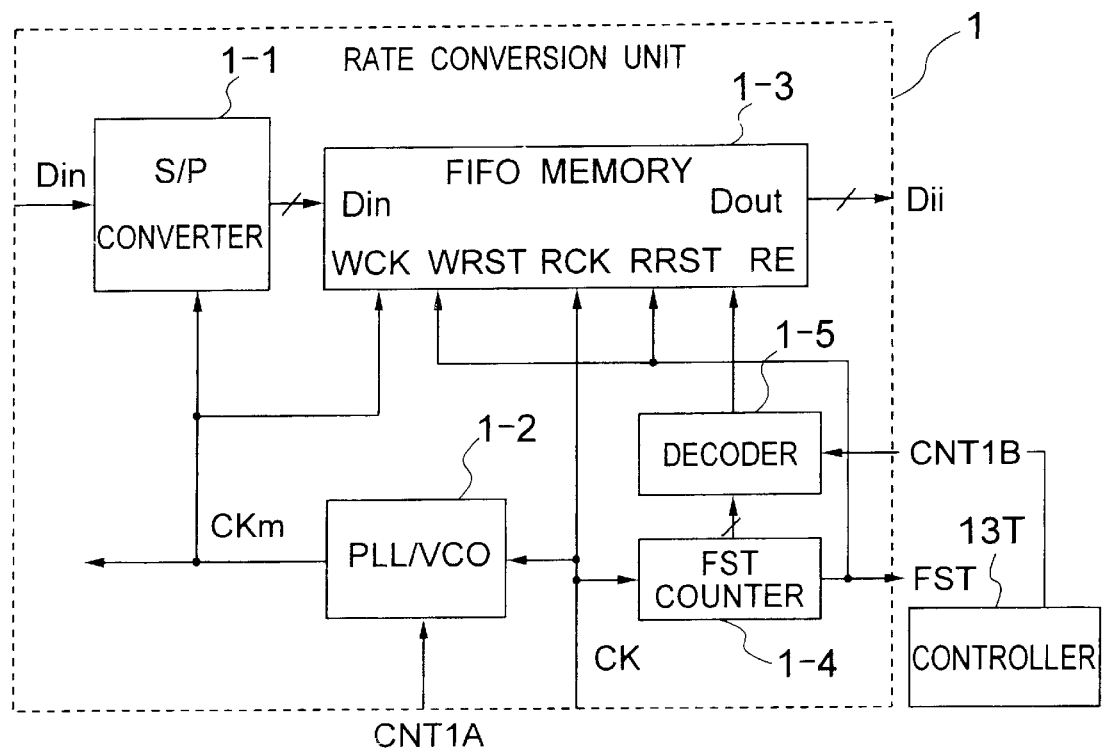
FIG. 8 is a block diagram schematically illustrating a rate conversion unit 1 used in the system according to the embodiment of the present invention.

A definite configuration of the rate conversion unit 1 used in the embodiment of the present invention is now described with reference to FIG. 8. The inputted clock CK is supplied to a change-over type PLL/VCO 1-2 and the PLL/VCO 1-2 produces a clock CKm having the frequency equal to N/G times of the clock CK. Further, the clock CK is supplied to an FST counter 1-4, which produces the FST pulse which is a frame reference in processing of the transmission side. The FST pulse from the FST counter 1-4 is supplied to WRST and RRST terminals of an FIFO memory 1-3 as a reference of reset. Reading of data from the FIFO memory 1-3 is made on the basis of a level at an RE terminal in synchronism with the clock of the RCK terminal.

A pulse to the RE terminal is supplied from a change-over type decoder 1-5. The decoder 1-5 is supplied with a counter address value form the FST counter 1-4 and changes a decoding condition in response to the control signal CNT1B to change an RE pulse output period.

The inputted serial data Din is supplied to a serial-to-parallel (S/P) converter 1-1 to be converted into a parallel signal, which is inputted to the FIFO memory 1-3. The change-over type PLL/VCO 1-2 is supplied with the control signal CNT1A and changes a frequency division ratio of the clock to be outputted in response to the control signal CNT1A.

Figure 9:
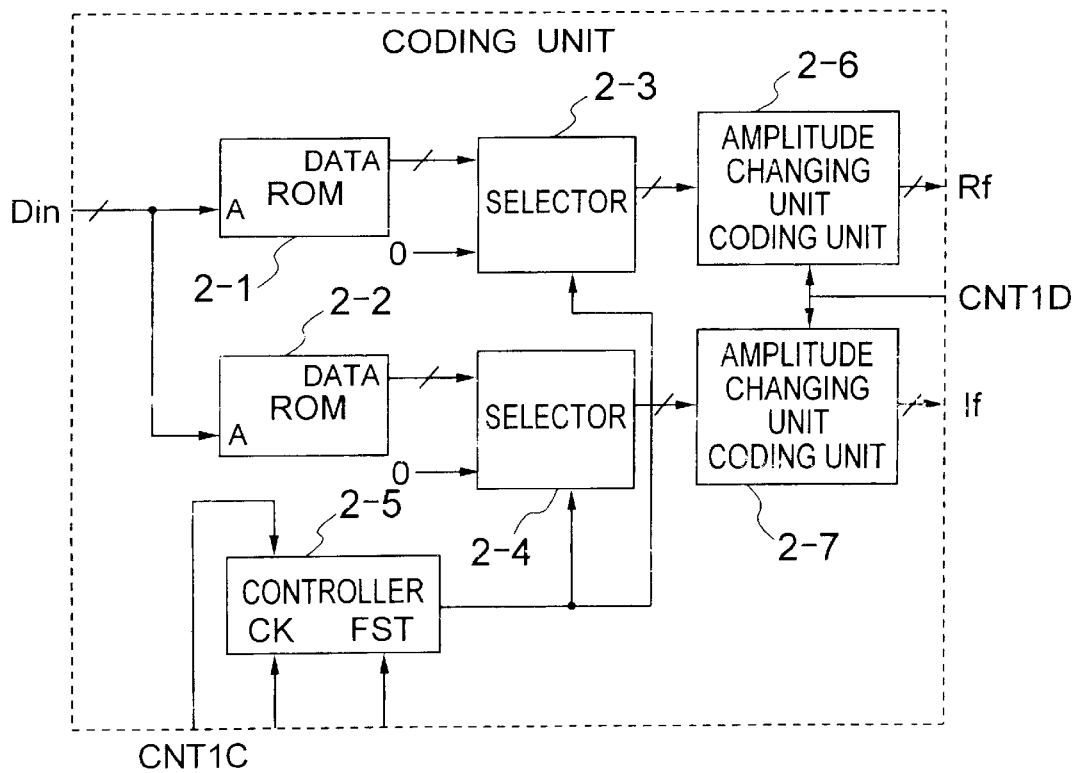
FIG. 9 is a block diagram schematically illustrating a coding unit 2T used in the system according to the embodiment of the present invention.

An definite configuration of the coding unit 2T used in the embodiment of the present invention is now described with reference to FIG. 9. The inputted signal Dii is supplied to mapping ROMs 2-1 and 2-2 in which the signal Dii is converted into signals at predetermined points of I and Q axes. The outputs of the ROMs 2-1 and 2-2 are supplied to selectors 2-3 and 2-4. Outputs produced by the selectors 2-3 and 2-4 are outputted through amplitude changing units 2-6 and 2-7.

The control signal CNT1D is inputted to control terminals of the amplitude changing units 2-6 an 2-7. A change pulse produced by the change-over type controller 2-5 is supplied to input selection terminals of the selectors 2-3 and 2-4. The control signal CNT1C is supplied to the change-over type controller 2-5 to change the decoding condition for preparation of the change pulse.

Signals in the period corresponding to the unnecessary carriers described above (FIG. 5) are substituted with "0" in the selectors 2-3 and 2-4 to thereby produce the signals Rf and If.

Figure 10:
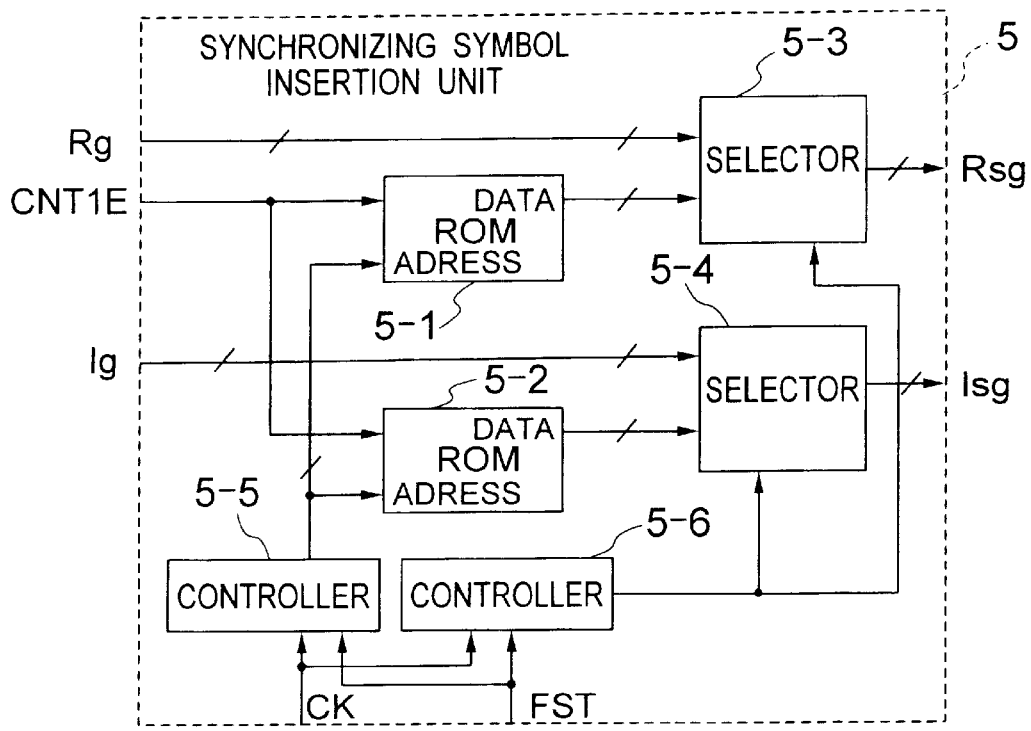
FIG. 10 is a block diagram schematically illustrating a synchronizing symbol insertion unit 5 used in the system according to the embodiment of the present invention.

Configuration of the synchronizing symbol insertion unit 5 used in the embodiment of the present invention is now described with reference to FIG. 10. ROms 5-1 and 5-2 controlled by a controller 5-5 having the timing determined by the clock CK and the FST pulse produce the synchronizing symbol signals at the timing according to the FST pulse. Similarly, selectors 5-3 and 5-4 controlled by a controller 5-6 having the timing determined by the clock CK and the FST pulse select the synchronizing symbol signals from the ROMs 5-1 and 5-2 only during one to four symbol periods, which are the no-signal periods in the current stage, of the prepared guard-added time signals Rg and Ig and output the selected signals.

The control signal CNT1E is inputted to upper-part address terminals of the ROMs 5-1 and 5-2 so that the SWEEP symbol patterns having different upper limit and lower limit frequencies are selected to be outputted.

Figure 12:
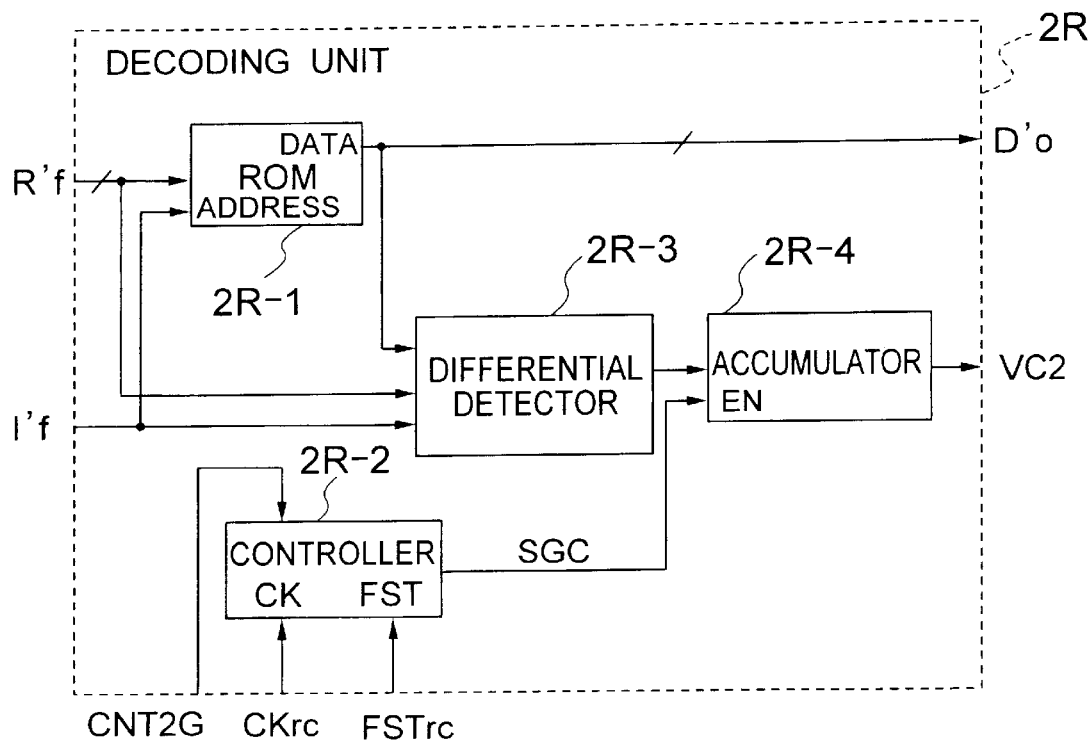
FIG. 12 is a block diagram schematically illustrating a decoding unit 2R used in the system according to the embodiment of the present invention.

An definite configuration of the decoding unit 2R used in the embodiment of the present invention is now described with reference to FIG. 12. Input signals R'f and I'f are supplied to address terminals of an ROM 2R-1 and a differential detector 2R-3. An output D'o from the ROM 2R-1 is outputted from an output terminal and is supplied to the differential detector 2R-3. An output of the differential detector 2R-3 is supplied to an accumulator 2R-4. An EN terminal of the accumulator 2R-4 is supplied with an SGC signal supplied from a controller 2R-2 and indicating the data period for decoding.

The differential detector 2R-3 calculates a differential vector of an originally existing signal point on mapping, identified by the ROM 2R-1 and signal points of R'f and I'f inputted to the decoding unit 2R.

The accumulator 2R-4 takes in the differential vector on the basis of the SGC signal only during the period that carriers exist in the signal of the bandwidth which is frequency-converted by the FFC 3C. The controller 2R-2 changes the SGC signal indicating the data period for decoding in response to the control signal CNT2G on the basis of the clock CKrc and the pulse FSTrc.

Figure 13:
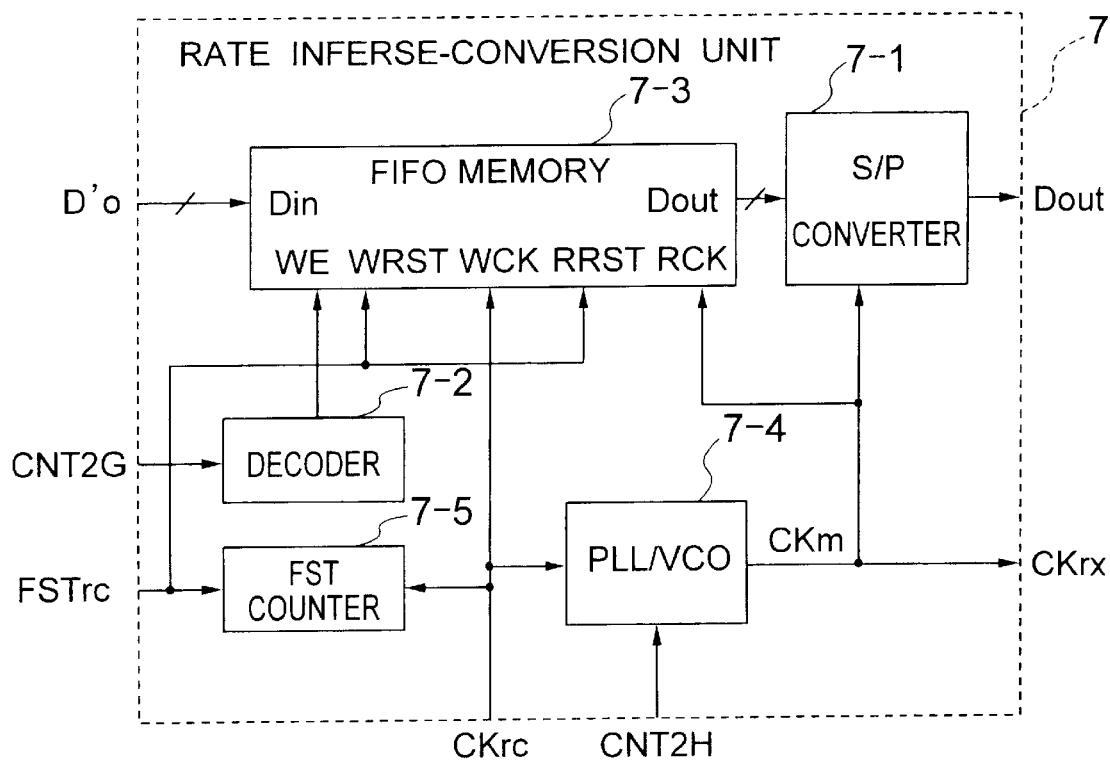
FIG. 13 is a block diagram schematically illustrating a rate inverse-conversion unit 7 used in the system according to the embodiment of the present invention.

Configuration of the rate inverse-conversion unit 7 used in the embodiment of the present invention is now described with reference to FIG. 13. The input signal D'o is connected to a Din terminal of an FIFO memory 7-3. An output of a decoder 7-2 is connected to a WE terminal for controlling writing. The decoder 7-2 changes a signal period to the WE terminal on the basis of the control signal CNT2G. A PLL/VCO 7-4 changes a frequency division ratio of the clock in accordance with the control signal CNT2H. Consequently, the mode for rate inverse-conversion is changed.

Figure 5:
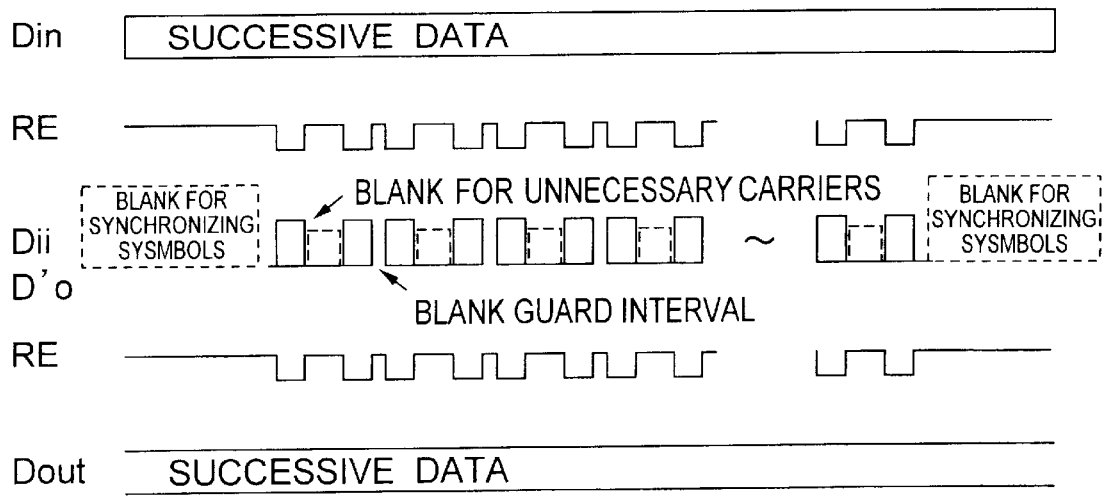
FIG. 5 is a timing chart showing operation of the embodiment of the present invention in case where the number of carriers is changed.
Figure 6:
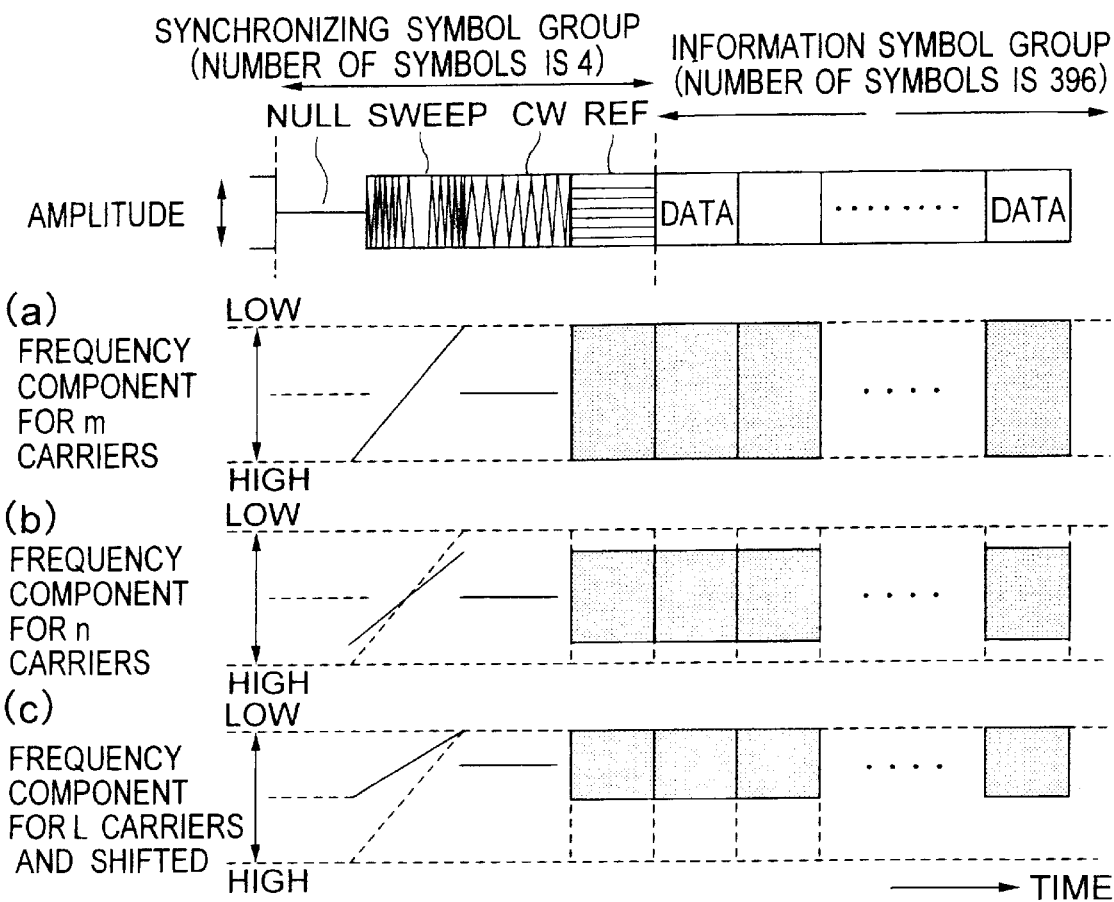
FIG. 6 shows states of frequency components in the embodiment of the present invention in case where the number of carriers is changed.

The timing operation of the rate conversion unit 1 and the rate inverse-conversion unit 7 described above is shown in FIG. 5 and difference in frequency component upon changing of the number of carriers is shown in FIG. 6.

In FIG. 6, the ordinate axis represents the frequency and the hatched portion represents an effective signal area. Symbols n, m and L are any positive integers. (a) in FIG. 6 shows the case where the number m of carriers is set so that all of the frequency bandwidths to which the transmission signal is given are used. (b) in FIG. 6 shows the case the number of carriers is changed to n smaller than m and the bandwidth of the transmission signal is reduced as compared with the case of (a). (c) in FIG. 6 shows the case where the number of carriers is change to L smaller than m to reduce the bandwidth of the transmission signal to a half and the carrier frequency is shifted to the lower side. In the case of (c), another channel having the same transmission bandwidth in the higher frequency side can be set.

Figure 2:
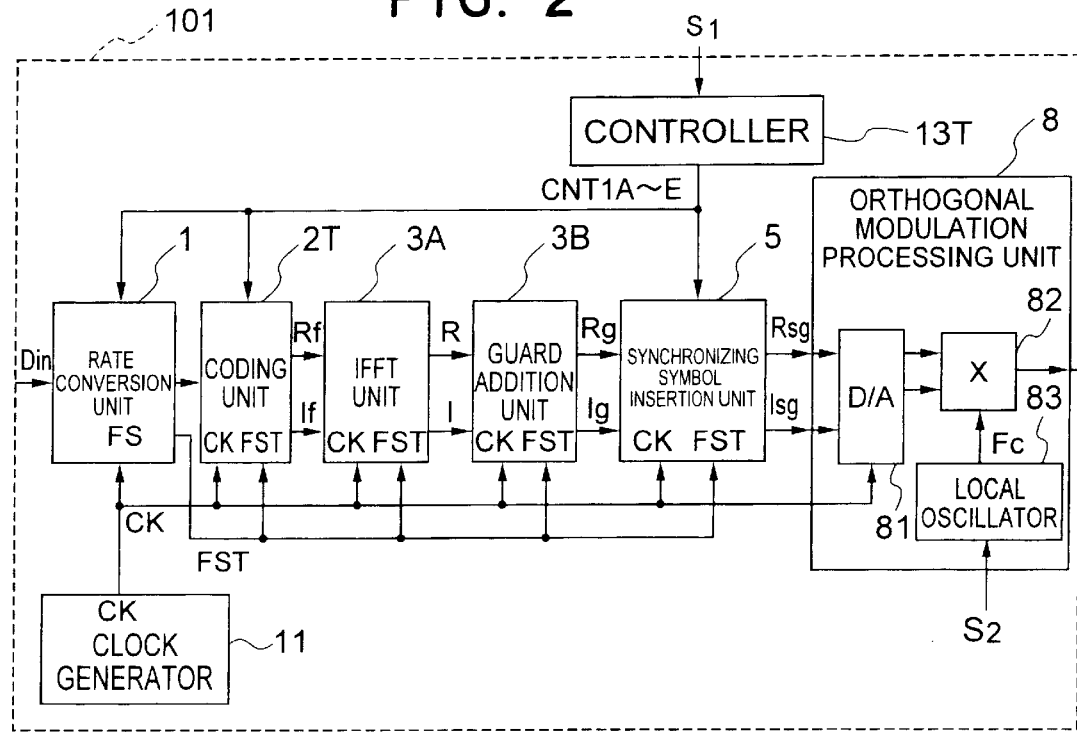
FIG. 2 is a block diagram schematically illustrating the overall configuration of an OFDM communication system according to another embodiment of the present invention.
Figure 2:
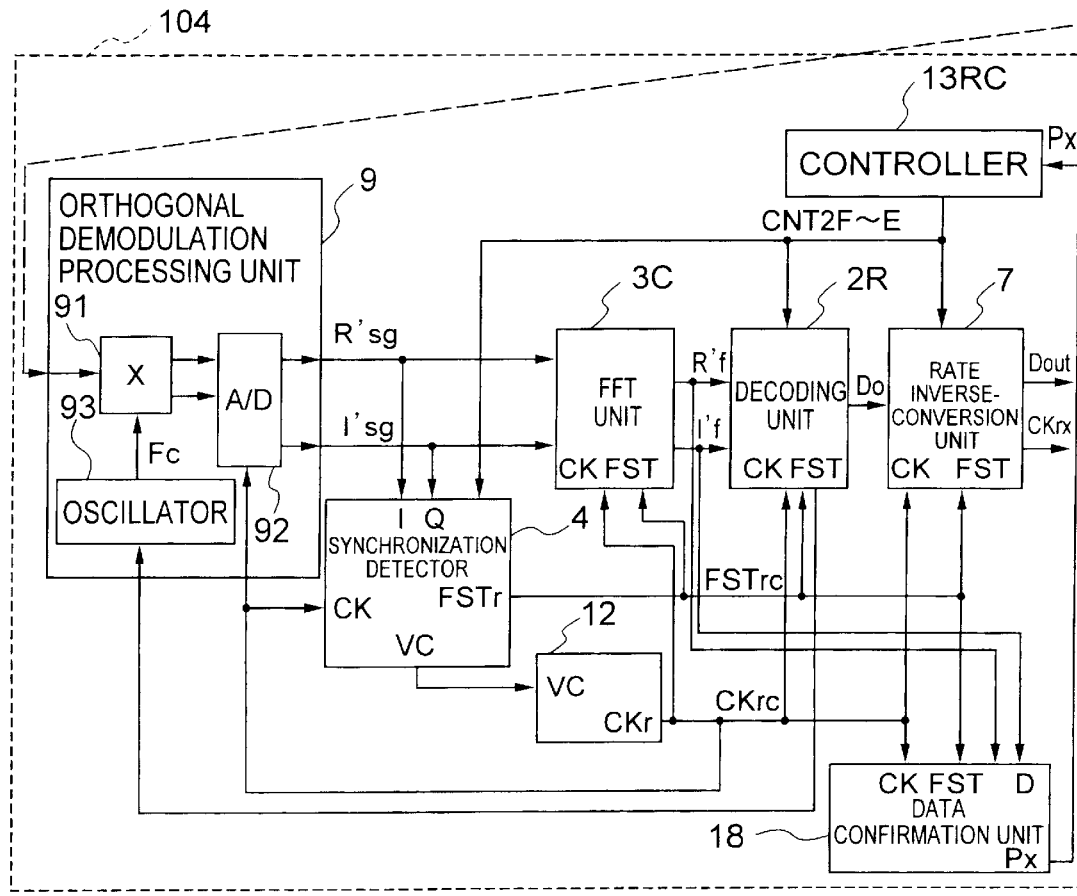

A bandwidth changeable transmission system according to a second embodiment of the present invention is now described with reference to FIG. 2 schematically illustrating the overall configuration thereof in a block diagram.

The FSTrc signal of the synchronization detector 15 is supplied to an FST terminal of the data confirmation unit 18 and the clock CKrc is supplied to a CK terminal of the data confirmation unit 18. The outputs R'f and I'f of the FFT unit 3C are supplied to D terminals of the data confirmation unit 18. An output Px of the data confirmation unit 18 is supplied to a control terminal of a controller 13RC.

Overall operation of the embodiment is now described.

When the carriers are set to be N/G times in the controller 13T at the transmission side, the number of carriers, the SWEEP synchronizing symbol range and the like are changed and the transmission bandwidth is also changed to NIG times.

At this time, the FFC unit 3C at the receiving side produces the frequency components of the bandwidth determined by the number of FFT samples and the sampling frequency successively.

Accordingly, the bandwidth being used for transmission and hence the number of carriers is confirmed by detecting the position of the carrier having the level of "0". More particularly, since the components of carriers appear from the FFT unit 3C, the timing that the level 0 is started may be counted on the basis of the FSTrc signal or the like.

Namely, the data confirmation unit 18 examines the states (level) of the signals R'f and I'f and sends a Px signal indicating change of the bandwidth at the transmission side to the controller 13RC.

Respective operation modes of the synchronization detector 15, the decoding unit 2R and the rate inverse-conversion unit 7 are changed to the number of carriers corresponding to the change of the bandwidth at the transmission side in accordance with the control signals CNT2F to CNT2H from the controller 13RC.

Figure 23A:
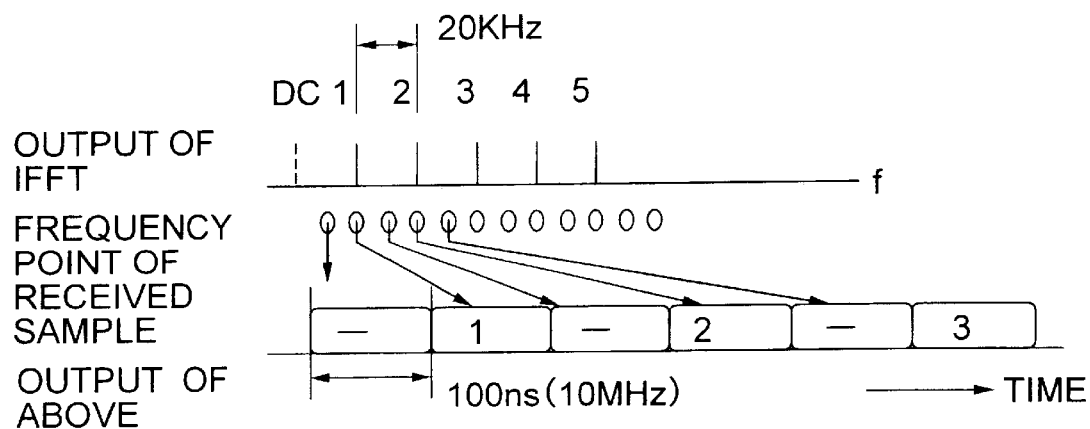
FIGS. 23A and 23B are timing charts of signals for explaining operation of a data confirmation unit in the embodiment of the present invention.
Figure 23B:
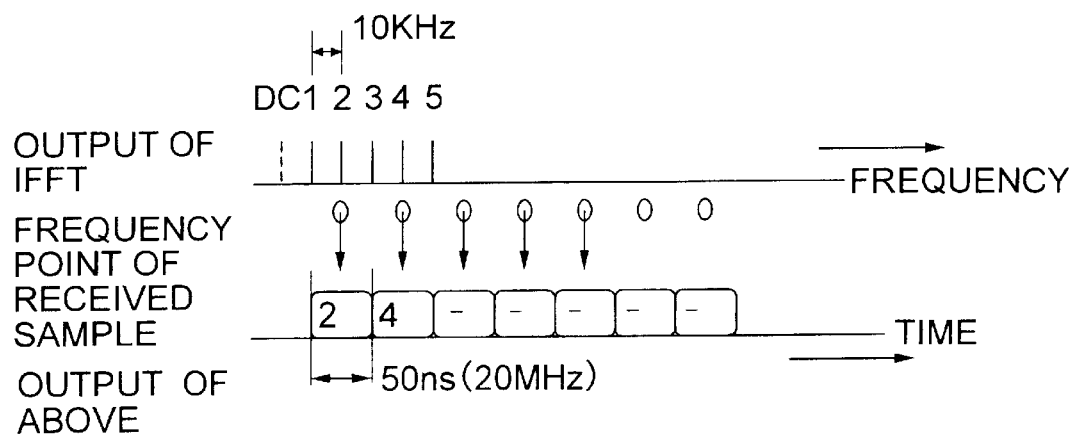
Figure 23:
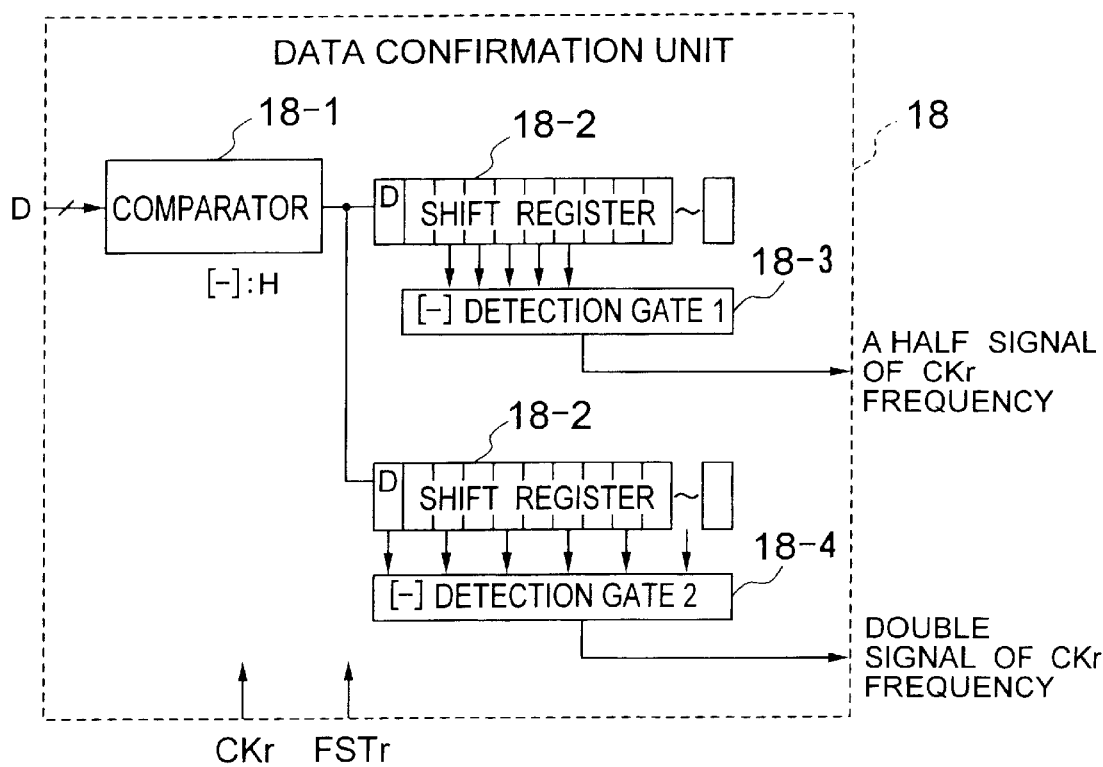
FIG. 23C is a block diagram schematically illustrating the data confirmation unit.

Referring now to FIGS. 23A, 23B and 23C, operation and configuration of the data confirmation unit 18 of the receiver 104 are described in detail.

FIG. 23A shows the frequency distribution of the IFFT output at intervals of carriers of about 20 KHz using the frequency CKd of 20 MHz at the transmission side and an example where the frequency component of the received signal is sampled at intervals of about 10 KHz using the frequency CKr of 10 MHz at the receiving side. The sample frequency intervals of carriers at the transmission side are not coincident with the sample frequency intervals of carriers at the receiving side. Accordingly, no-component portions represented by "-" appear alternately in the output R'f of the FFT unit 3 indicating the frequency component of the received signal and furthermore the components also appear alternately in the sixth and subsequent outputs R'f which have no carrier originally.

FIG. 23B shows the frequency distribution of the IFFT output at intervals of carriers of about 10 KHz using the frequency CKd of 10 MHz at the transmission side and an example where the frequency component of the received signal is sampled at intervals of about 20 KHz using the frequency CKr of 20 MHz at the receiving side. Similarly, the sample frequency intervals of carriers at the transmission side are not coincident with the sample frequency intervals of carriers at the receiving side. Accordingly, the frequency components "1", "3" and the like of the received signal are not sampled and no-component portions represented by "-" appear in the fifth and previous outputs which have carriers originally.

FIG. 23C schematically illustrates the data confirmation unit 18 for five carriers. Whether the input signal includes components corresponding to transmission carriers or not is examined by a comparator 18-1. When the input signal includes no component as represented by "-", the input signal is successively inputted to a shift register 18-2 as a level H. A "-" detection gate produces an output H when contents at third and subsequent stages are H and correspond to the data symbol period in order to detect the state shown in FIG. 23B. A "-" detection gate 18-4 produces an output H when contents at odd stages and correspond to the data symbol period in order to detect the state shown in FIG. 23A.

Figure 26:
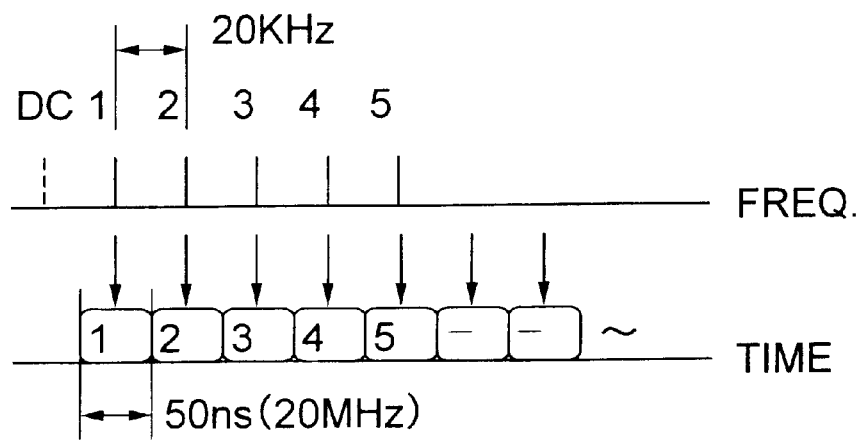
FIGS. 26A and 26B are diagrams for explaining a relation of an interval between carriers and a frequency bandwidth.
Figure 26:
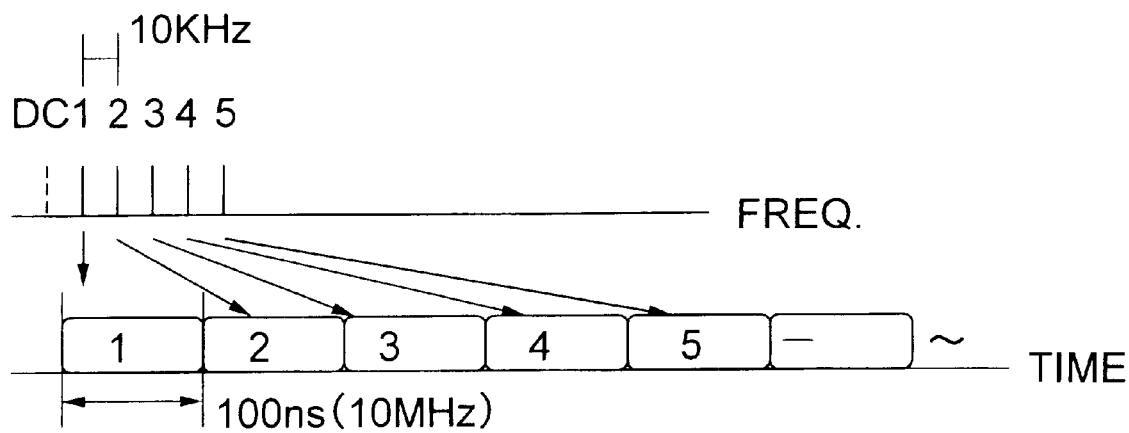

In the case of FIGS. 26A and 26B, since contents at fifth and previous stages as counted from left are set to a level L, both the "-" detection gates 18-3 and 18-4 do not produce any operation output H.

Operation in case where the number of carriers is changed while maintaining the number of information symbols as it is has been described in the foregoing.

Figure 3:
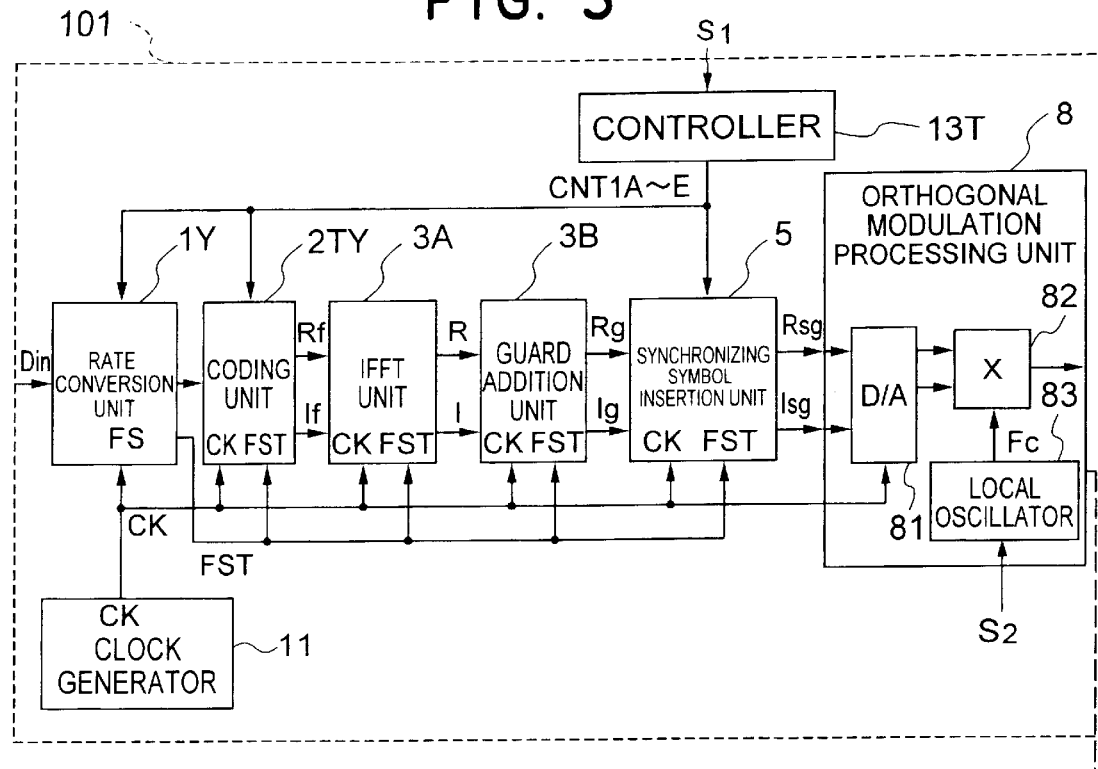
FIG. 3 is a block diagram schematically illustrating the overall configuration of an OFDM communication system according to still another embodiment of the present invention.
Figure 3:
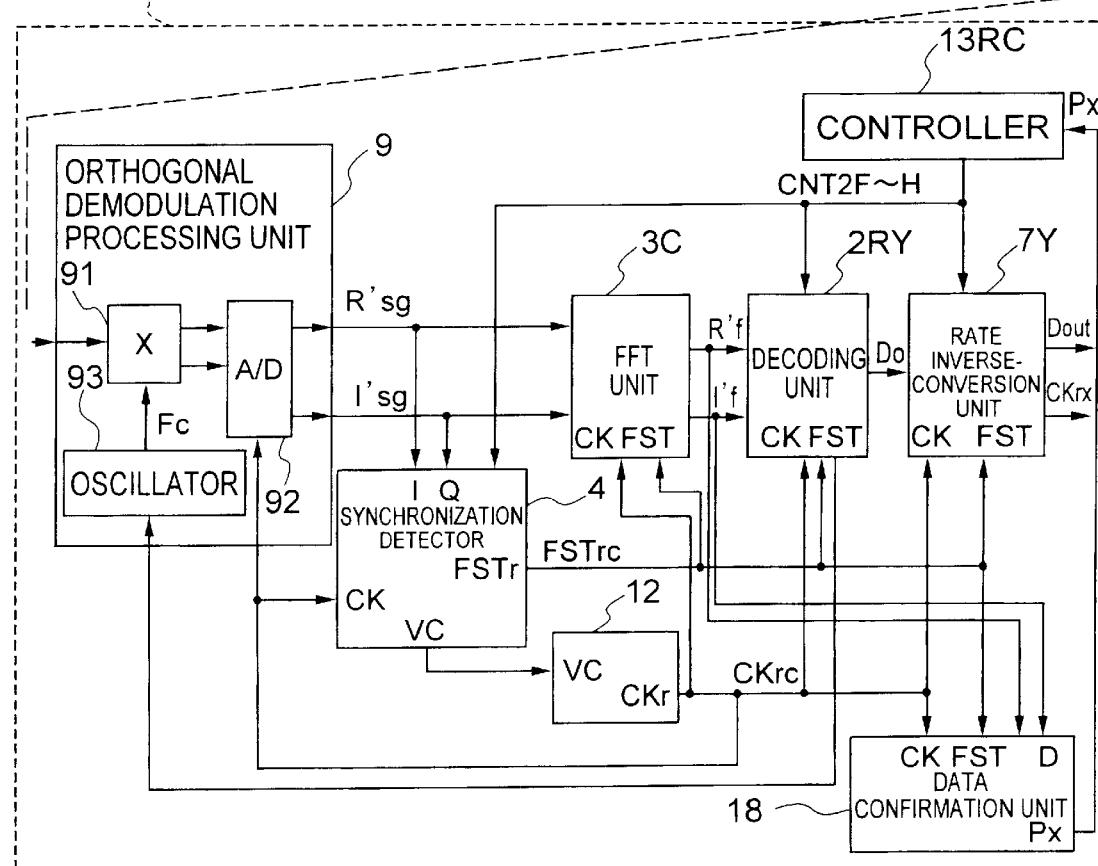

A bandwidth changeable transmission system according to a third embodiment of the present invention is now described with reference to FIG. 3 illustrating the overall configuration thereof in a block diagram. The bandwidth changeable transmission system is to change the number of carriers every symbol and substitutes a rate conversion unit 1Y, a coding unit 2TY, a decoding unit 2RY and a rate inverse-conversion unit 7Y for the rate conversion unit 1, a coding unit 2T, a decoding unit 2R and the rate inverse-conversion unit 7 of FIG. 2, respectively.

Figure 7:
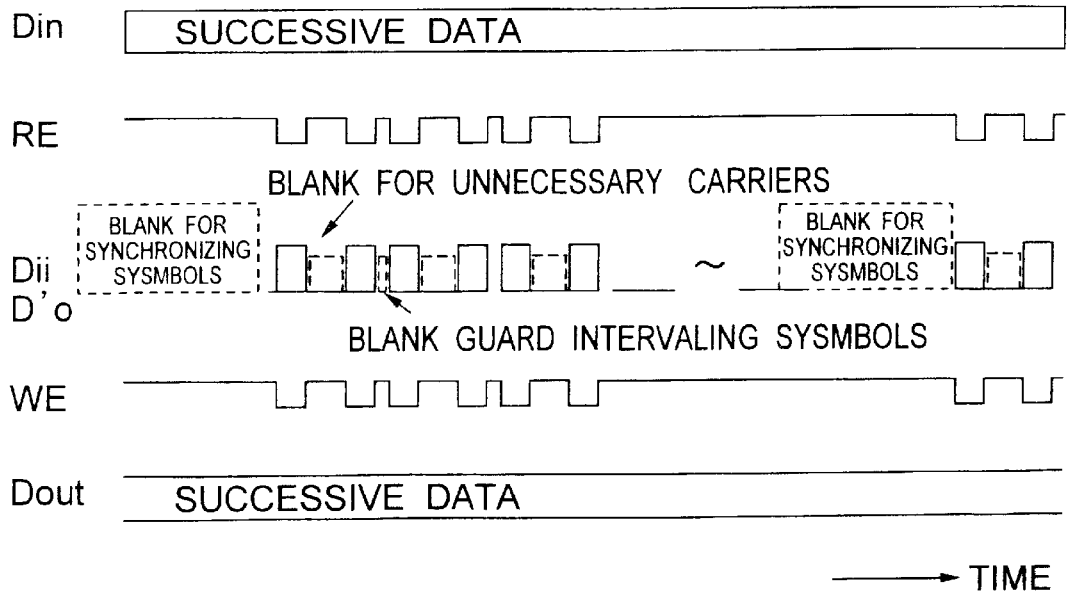
FIG. 7 is a timing chart showing operation of the embodiment of the present invention in case where the number of symbols is changed.

Operation thereof is now described with reference to FIGS. 5 to 7.

In the embodiment, the RE pulse and "0" substitution period, the period for accumulation and the WE pulse period are modified to be outputted at only the first half of the frame signal. The configuration is effective when it is applied to the case where the time allocation period of the transmission signal is modified in the time-division transmission or the like.

FIG. 6(a) shows the state of frequency components which are divided into two high and low parts in the center of the channel frequency and occupy all the bandwidths. FIG. 6(b) shows the state of frequency components which are divided into two high and low parts in the center of the channel frequency and in which the number of carriers is deleted so that all the bandwidths are not occupied but part of the bandwidths are occupied. FIG. 6(c) shows the state of frequency components in which the number of carriers is deleted so that all the bandwidths are not occupied but part of the bandwidths are occupied and the channel frequency is shifted to any of high and low parts from the center.

Figure 4:
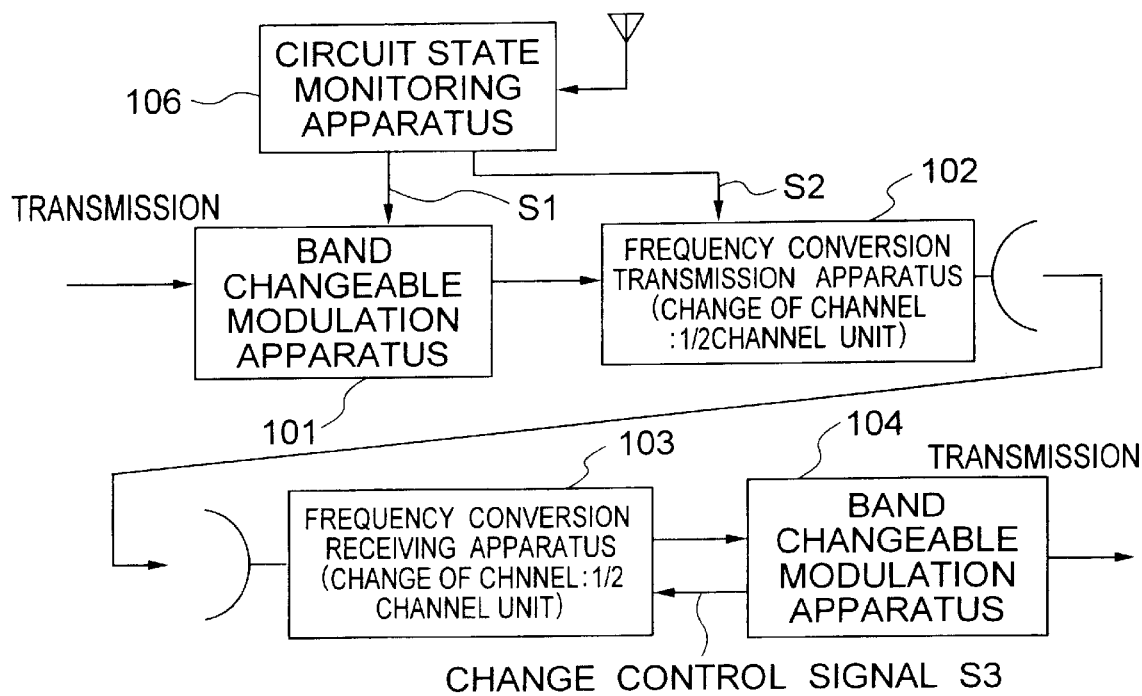
FIG. 4 is a block diagram schematically illustrating the overall configuration of an embodiment of an automatic bandwidth changeable transmission system to which the present invention is applied.

FIG. 4 schematically illustrates an automatic bandwidth changeable transmission system to which the present invention is applied.

A circuit state monitoring apparatus 106 examines the use state of electric wave in a circuit to be used and determines a frequency to be used and a usable bandwidth in accordance with the empty state thereof, so that a change control signal S1 is produced to be supplied to a control terminal of a bandwidth changeable modulation apparatus 101. Further, the monitoring apparatus 106 produces a change control signal S2 to be supplied to a control terminal of a frequency conversion transmission apparatus 102.

The bandwidth changeable modulation apparatus 101 and the frequency conversion transmission apparatus 102 constitute in large blocks the transmission side shown in FIGS. 1, 2 and 3 and the bandwidth changeable modulation apparatus 101 corresponds to the rate conversion unit 1 to the synchronizing symbol insertion unit 5 while the frequency conversion transmission apparatus 102 corresponds to the orthogonal modulation processing unit 8. The apparatuses include the function of capable of controlling the change externally.

Further, a bandwidth changeable demodulation apparatus 104 sends to a frequency conversion reception apparatus 103 a change control signal S3 from the demodulation state such as the presence of carriers.

The frequency conversion reception apparatus 103 and the bandwidth changeable demodulation apparatus 104 constitute in large blocks the receiving side shown in FIGS. 1, 2 and 3 and the frequency conversion reception apparatus 103 corresponds to the orthogonal demodulation processing unit 9 and the bandwidth changeable demodulation apparatus 104 corresponds to the FFT unit 3 to the rate inverse-conversion unit 7.

Operation of the system is now described.

Prior to the start of transmission, the circuit state monitoring apparatus 106 at the transmission side examines the use state of electric wave for a circuit to be used and determines a frequency to be used and a usable bandwidth in accordance with the empty state of the circuit.

The bandwidth to be used is designated to the bandwidth changeable modulation apparatus 101 by means of the change control signal S1 and the frequency to be used is designated to the frequency conversion transmission apparatus 102 by means of the change control signal S2.

The bandwidth changeable modulation apparatus 101 changes the number of carriers as described above so that the bandwidth to be used is set. Further, the frequency conversion transmission apparatus 102 controls the local oscillation frequency so that the frequency to be used is set. Thus, the transmission signal having the frequency to be used and the bandwidth to be used is transmitted to the receiving side.

On the other hand, the bandwidth changeable modulation apparatus 104 at the receiving side decides whether the current state corresponds to any of the state that all carriers are present, the state that only part of carriers are present and the approximately expected carriers are present and produces the change control signal S3 corresponding to the decided state to be supplied to the frequency conversion reception apparatus 103.

The frequency conversion reception apparatus 103 changes the reception frequency in accordance with the change control signal S3 so that the apparatus 103 can receive the transmission signal from the transmission side.

As configured above, there can structure the system which searches for an empty channel automatically and transmits data with the transmission bandwidth corresponding to the empty bandwidth.

More particularly, usually, in the transmission system using the transmission channel interval of 18 MHz and including the combined frequency conversion transmission apparatus 102 and frequency conversion reception apparatus 103, the scheme shown in FIG. 6(b) is used to shift the frequency to the upper side by a half channel in the frequency conversion transmission apparatus 102 to be outputted while in another frequency conversion transmission apparatus 102 the scheme shown in FIG. 6(*b*) is also used to shift the frequency to the lower side by a half channel to be outputted, so that signals for two channels can be transmitted by means of one transmission bandwidth.

Figure 24:
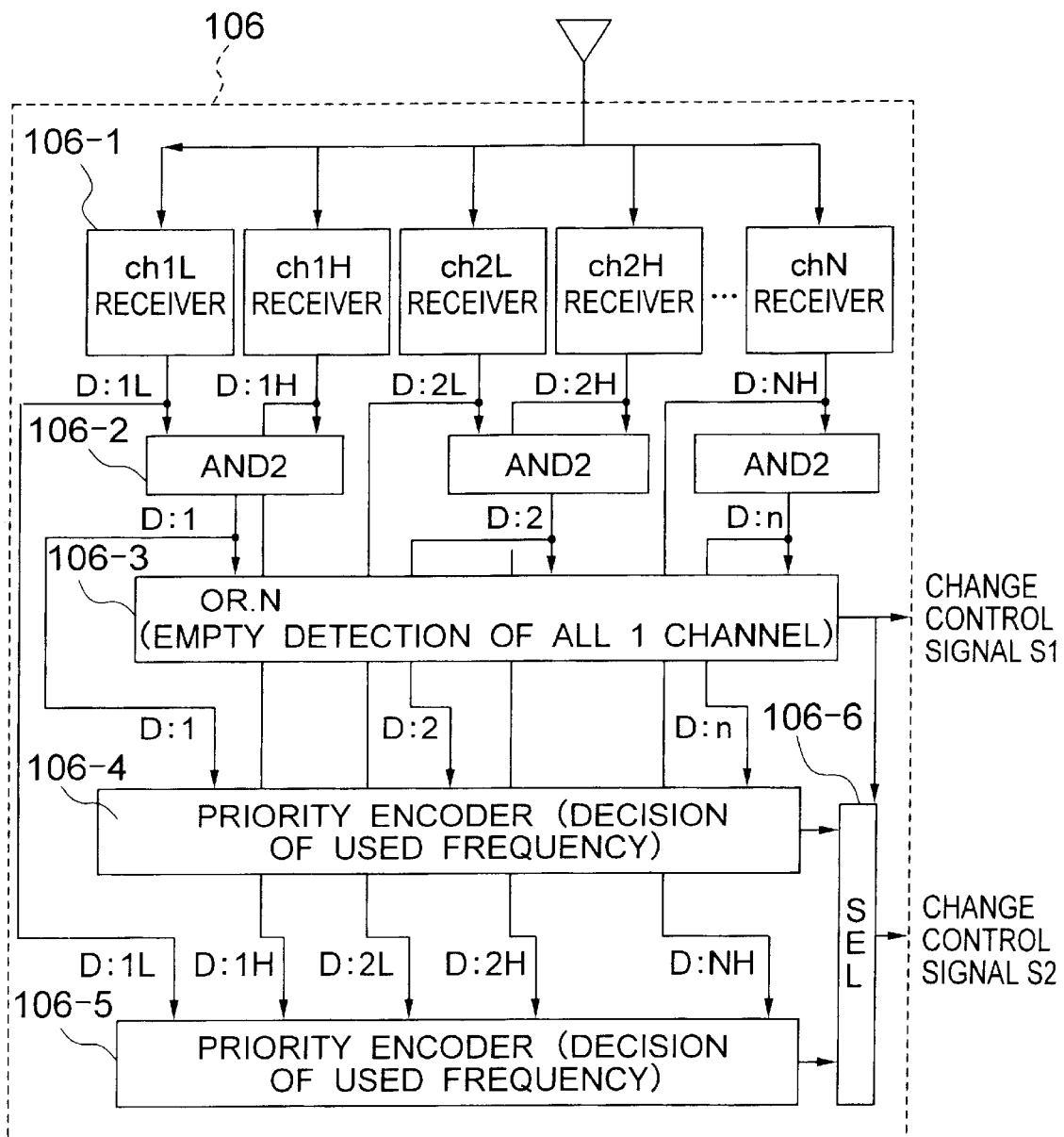
FIG. 24 is a block diagram schematically illustrating an example of a circuit state monitoring unit in the embodiment of the present invention.

FIG. 24 schematically illustrates an example of a circuit state monitoring apparatus 106. Detection signals from a group of receivers 106-1 indicating the use state of electric wave having the usable frequency bandwidth are supplied to a group 106-2 of ANDs 2 and a priority encoder 106-5. Outputs D1 to DN of the group of ANDs 2 are supplied to an OR.N and a priority encoder 106-4. An output of the OR.N is outputted as a change control signal 1 and is supplied to a control terminal of a SEL 106-6. The SEL 106-6 selects an output of the priority encoder 106-4 to be produced as a change control signal 2 when all of any one channel is empty and the output of the OR.N is high. Further, when all of any one channel is not empty but only a half channel is empty and the output of the OR.N is low, the SEL 106-6 selects an output of the priority encoder 106-5 to be produced as the change control signal 2. The priority encoder decides an output with preference to the presence of the leftmost signal in the drawing among the inputted signals. For example, when the leftmost signal D:1L is present, the same output is decided even if all other inputs are present and all other inputs are not present. Thus, it is judged that the leftmost channel is empty to determine the frequency to be used.

According to the embodiments of the present invention described above, there can realized the transmission apparatus in which the number of carriers can be changed at the transmission side to change the bandwidth and the change of the bandwidth can be followed at the receiving side automatically.

A further embodiment of an OFDM modulation system which can change the frequency bandwidth for a transmission signal according to the present invention is now described with reference to the drawings. In the embodiment described below, the clock frequency is changed to thereby change the frequency interval between adjacent carriers so that the whole transmission frequency bandwidth is changed.

In the embodiment to be described below, the rate of the clock supplied to each portion is changed at the transmission side, and at the receiving side the synchronizing signal detected from the received signal is phase-compared with the frame signal prepared by frequency-dividing the clock at the receiving side. The clock frequency of the receiving side clock oscillator is controlled in accordance with the compared result and the bandwidth to be demodulated at the receiving side is caused to follow the bandwidth at the transmission side automatically so that the transmission bandwidth is changed.

More particularly, in the IFFT transform at the transmission side, the n-th data fn determines an amplitude level at the period 1024/(n S) of the n-th carrier. In this connection, when the period of the clock supplied to the IFFT transform unit is changed, the frequency of the n-th carrier is also changed. The transmission bandwidth is determined by the maximum frequency of the generated carrier.

Namely, change of the bandwidth can be realized by changing the period of the clock. Further, by changing the period of the clock, the symbol period is also changed and the frame period determined by the number of symbol is also changed.

At the receiving side, the period of the SWEEP symbol and the NULL symbol detected from the received signal, that is, the frame period at the transmission side is compared with the FSTr period defined in the frame counter and the period of the clock at the receiving side is controlled to minimize the difference therebetween. Thus, there can structure the transmission system which can automatically follow the bandwidth changing processing performed at the transmission side.

Figure 25:
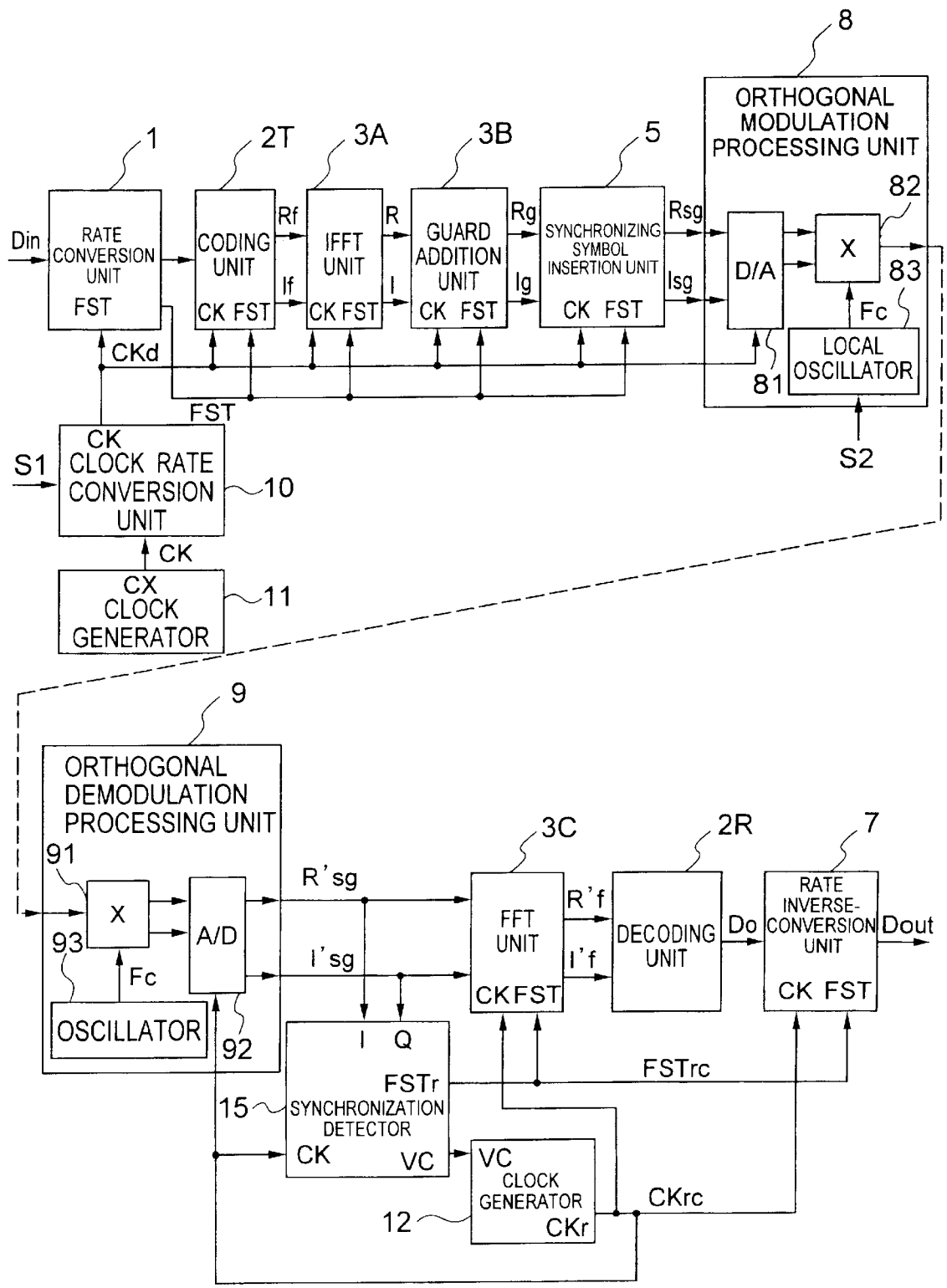
FIG. 25 is a block diagram schematically illustrating the overall configuration of an OFDM communication system according to a further embodiment of the present invention.

The bandwidth changing transmission system of the embodiment is now described with reference to FIG. 25 schematically illustrating the overall configuration thereof in a block diagram.

At the transmission side, the clock output terminal of the clock oscillator 11 is connected to a clock rate conversion unit 10. A clock output terminal of the clock rate conversion unit 10 is connected to the respective clock terminals of the rate conversion unit 1, the coding unit 2T, the IFFT unit 3A, the guard addition unit 3B, the synchronizing symbol insertion unit 5 and the orthogonal modulation processing unit 8.

At the receiving side, the output VC of the synchronization detector 15 is connected to the terminal VC of the voltage controlled clock oscillator 12. The output FSTr of the synchronization detector 15 is connected to the respective FST terminals of the FFT unit 3C and the rate inverse-conversion unit 7. The output CKr of the voltage controlled clock oscillator 12 is connected to the respective clock CK terminals of the FFT unit 3C, the rate inverse-conversion unit 7, the orthogonal demodulation processing unit 9 and the synchronization detector 15.

The bandwidth changeable processing operation at the transmission side is first described.

When the transmission bandwidth is changed, the clock rate conversion unit 10 changes the clock CK from the clock oscillator 11 to the clock having the rate corresponding to the bandwidth to be changed. That is, the clock rate conversion unit 10 produces the clock CKd having the rate equal to V times the rate of the clock CK.

Since the frame period pulse FST produced by the rate conversion unit 1 is outputted every counting of, for example, 1056×400 clocks CKd, the coding unit 2T, the IFFT unit 3A, the guard addition unit 3B, the synchronizing symbol insertion unit 5 and the orthogonal modulation processing unit 8 which are operated on the basis of the clock CK and the frame period pulse FST produce the output data having the sample rate changed to (V/NR) times during the period changed to (NR/V) times.

Further, since the rate of the clock CK inputted to the PLL/VCO 1-2 (FIG. 8) in the rate conversion unit 1 is changed to V times, the rate of NIG of the clock CKm is also changed to (V/NR) times and the rate of the taken-in data Din is also changed to (V/NR) times.

The case where (V/NR) is equal to, for example, ½ is described. In this case, when the rate of the sample clock CKd in the IFFT unit 3A is set to ½, the interval of carriers is set to ½ and the symbol period is increased to two times.

At this time, since the bandwidth is determined on the basis of the product of the carrier interval and the number of carriers and the number of carriers is not changed, the bandwidth is reduced to a half in this example where (V/NR) is ½.

Namely, the clock rate can be set to (V/NR) times to thereby change the bandwidth to (V/NR) times.

Change of the bandwidth by changing the frequency CKd is now described by taking as an example the case where the number of carriers is 5 for simplification of description. FIG. 26A shows the frequency component distribution of the IFFT output at intervals between carriers of about 20 KHz using the frequency CKd of 20 MHz at the transmission side and an example where the frequency component of the received signal is sampled at intervals of about 20 KHz using the frequency CKr of 20 MHz at the receiving side. The frequency component distribution of the time waveform R produced by the IFFT 3A is shown at the upper side of FIG. 26A and a series of data R'f having the frequency component obtained in the FFT unit 3C by receiving the OFDM wave prepared from the time waveform R or the like is shown.

FIG. 26B shows the frequency distribution of the IFFT output at intervals of carriers of about 10 KHz using the frequency CKd of 10 MHz at the transmission side and an example where the frequency component of the received signal is sampled at intervals of about 10 KHz using the frequency CKr of 10 MHz at the receiving side. The sample frequency intervals of carriers at the transmission side are coincident with the sample frequency intervals of carriers at the received side are coincident. Further, since no clear frequency component appear in sixth and subsequent received data string in which any carrier is not set, "-" in FIGS. 26A and 26B shows no frequency component.

The bandwidth change processing operation at the receiving side is now described.

The synchronization detector 15 searches for the SWEEP symbol on the basis of the NULL period detected from the inputted signals R'sg and I'sg as described above and phase-compares the SWEEP symbol with the coincidence pulse indicating the reception frame period to control the frequency of the clock CKrc. Further, the synchronization detector 15 produces the frame period pulse FSTrc prepared by counting, for example, 1056×400 clocks CKrc.

Since the FFT unit 3C and the rate inverse-conversion unit 7 are operated by the pulse FSTrc and the clock CKrc, the coincidence pulse for a reference of the phase comparison with the pulse FSTrc has the period equal to NR/V times when the sample rate at the transmission side is multiplied by V/NR and accordingly when the clock CKrc is changed to the frequency equal to V/NR times the usual frequency, the frequencies and the phases of the pulse FSTrc and the coincidence pulse are coincident with each other.

Figure 27:
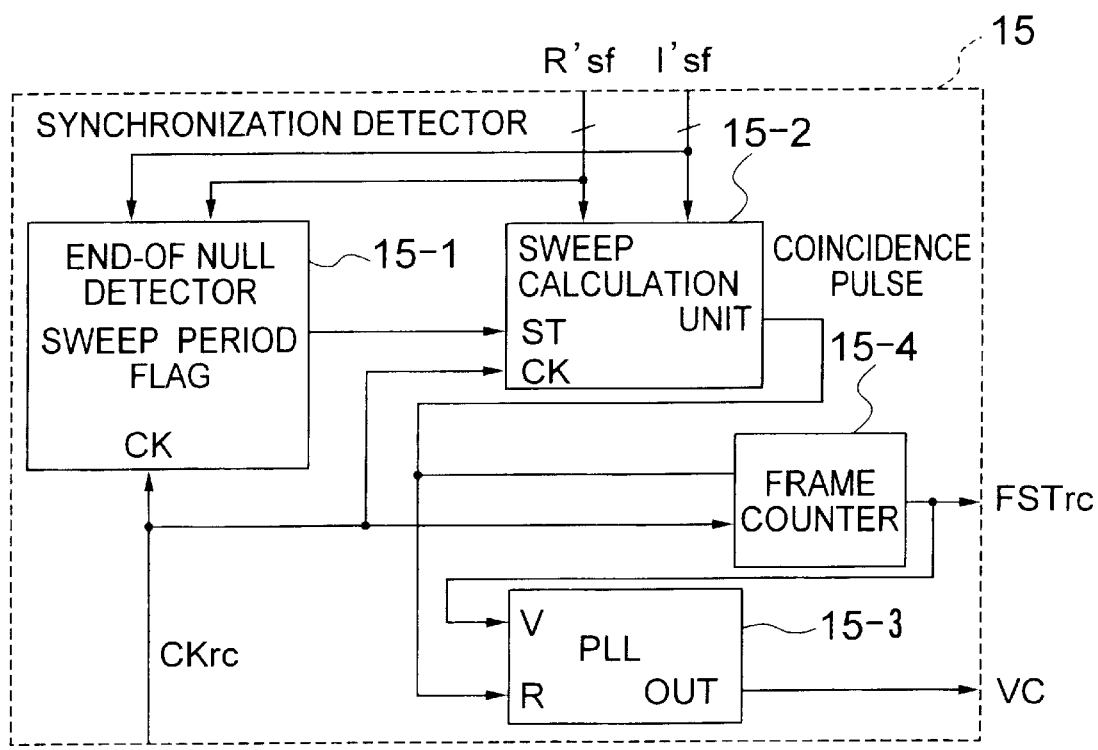
FIG. 27 is a block diagram schematically illustrating a synchronization detection unit 15 used in the system according to the embodiment of the present invention.

A definite configuration of the synchronization detector 15 is now described with reference to FIG. 27. The inputted signals R'sg and I'sg are supplied to the end-of-NULL detector 15-1 and the SWEEP calculation unit 15-2. The SWEEP flag pulse produced by the end-of-NULL detector 15-1 is supplied to the ST terminal of the SWEEP calculation unit 15-2.

The clock CKrc is supplied to the respective terminal CK terminals of the end-of-NULL detector 15-1, the SWEEP calculation unit 15-2 and the frame counter 15-4.

The coincidence pulse produced by the SWEEP calculation unit 15-2 is supplied to an R terminal of a PLL 15-3.

Further, the FSTrc of the frame counter 15-4 which counts 1056×400 clocks CKrc is inputted to a subsequent circuit connected to the output of the frame counter and a V terminal of the PLL 15-3.

The PLL 15-3 produces a signal VC of which a voltage is varied in accordance with a phase of the pulse inputted to the V and R terminals thereof.

The voltage controlled clock generator 12 increases or decreases the frequency of the clock CKrc produced thereby in accordance with a magnitude of a voltage of the signal VC supplied from the synchronization detector 15, that is, in accordance with the clock rate conversion of the clock CKd at the transmission side.

With the above processing, the clock CKrc and the frame period pulse FSTrc used at the receiving side can follow the clock CKd and the frame period pulse FST changed at the transmission side.

Figure 28:
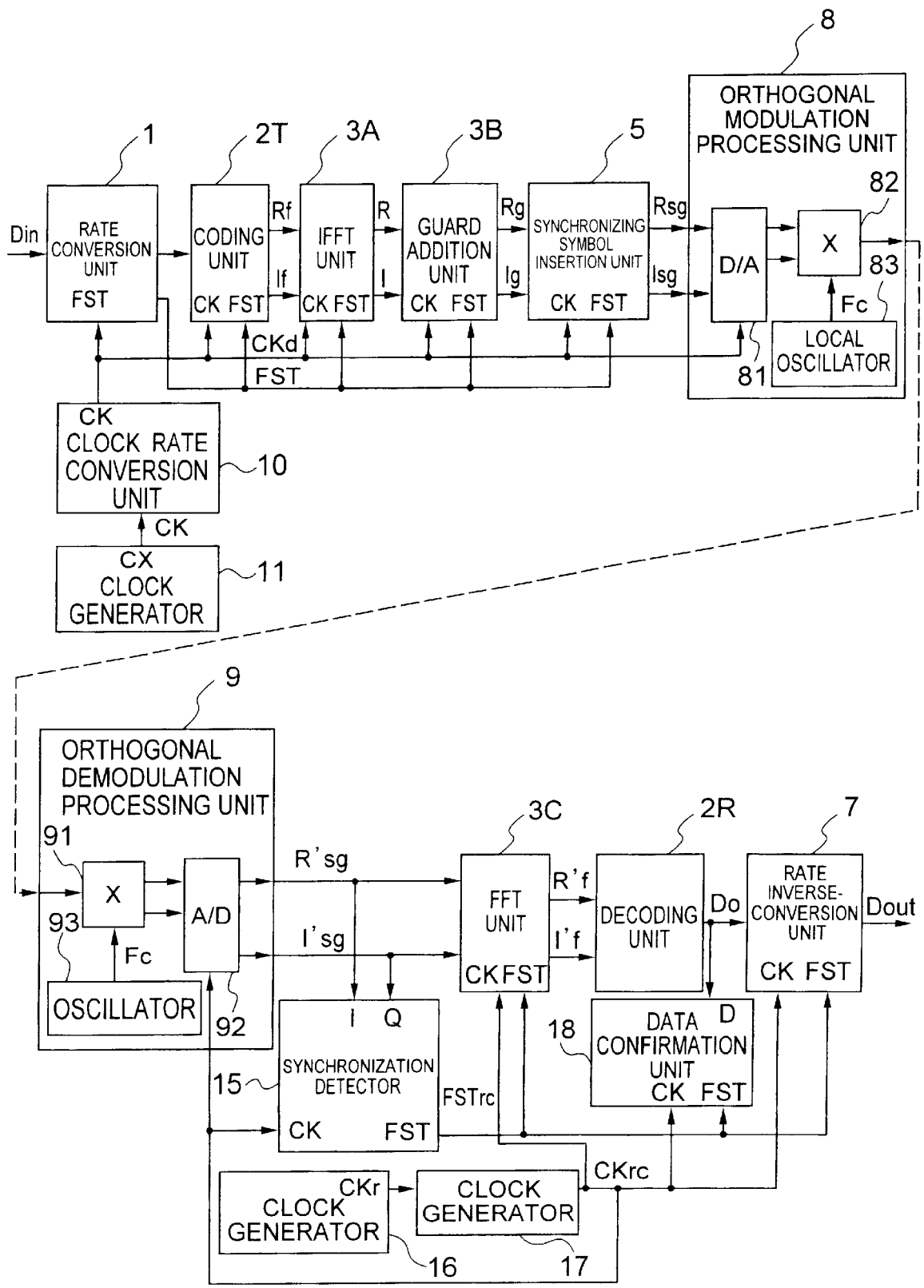
FIG. 28 is a block diagram schematically illustrating the overall configuration of an OFDM communication system according to a still further embodiment of the present invention.

A second embodiment of the bandwidth changeable transmission system using change of the clock is schematically illustrated in FIG. 28 in a block diagram and portions different from FIG. 25 are now described mainly.

An output clock CKrc of a clock oscillator 16 at the receiving side is supplied to a clock rate conversion unit 17. An output clock CKrc of the clock rate conversion unit 17 are supplied to the respective CK terminals of the FFT unit 3C, the rate conversion unit 7 and the data confirmation unit 18.

The FST terminal of the data confirmation unit 18 is supplied with the pulse FSTrc of the synchronization detector 15 and the D terminal of the data confirmation unit is supplied with the D'o of the coding unit 2R.

As described above, when the transmission bandwidth at the transmission side is set to V/NR (for example, 1), the number of carriers is not changed and accordingly the interval of carrier is V/NR.

When the FFT transform operation is performed with the original clock rate at the receiving side, that is, when the FFT transform operation is performed as the carrier interval is maintained to a half, the output D'o obtained from the decoding unit 2R as the result thereof becomes a toothless state in which "0" is set alternately. Further, on the contrary, when the FFT transform operation is performed with the clock rate at the transmission side being a half and the clock rate at the receiving side being one time, the output D'o obtained from the decoding unit 2R is set in the state that there is no data of carriers having a higher frequency.

Accordingly, the data confirmation unit 18 examines the state of the output D'o to confirm the change state of the clock rate at the transmission side.

The data confirmation unit 18 produces a control signal for instructing change of the clock rate to be supplied to the clock rate conversion unit 17 so that the clock rate at the receiving side is equal to the clock rate corresponding to the change of the clock rate at the transmission side.

Consequently, the clock rate conversion unit 17 changes the clock CKrc at the receiving side to the clock rate corresponding to the change of the clock rate at the transmission side in response to the control signal supplied from the data confirmation unit 18.

In this connection, by changing the clock rate at the transmission side to a half, a third or the like simply, false detection in the confirmation operation of the data confirmation unit 18 at the receiving side can be reduced.

With the configuration described above, the clock CKrc and the frame period pulse FSTrc used at the receiving side can follow the clock CKd and the frame period pulse FST changed at the transmission side.

Figure 29:
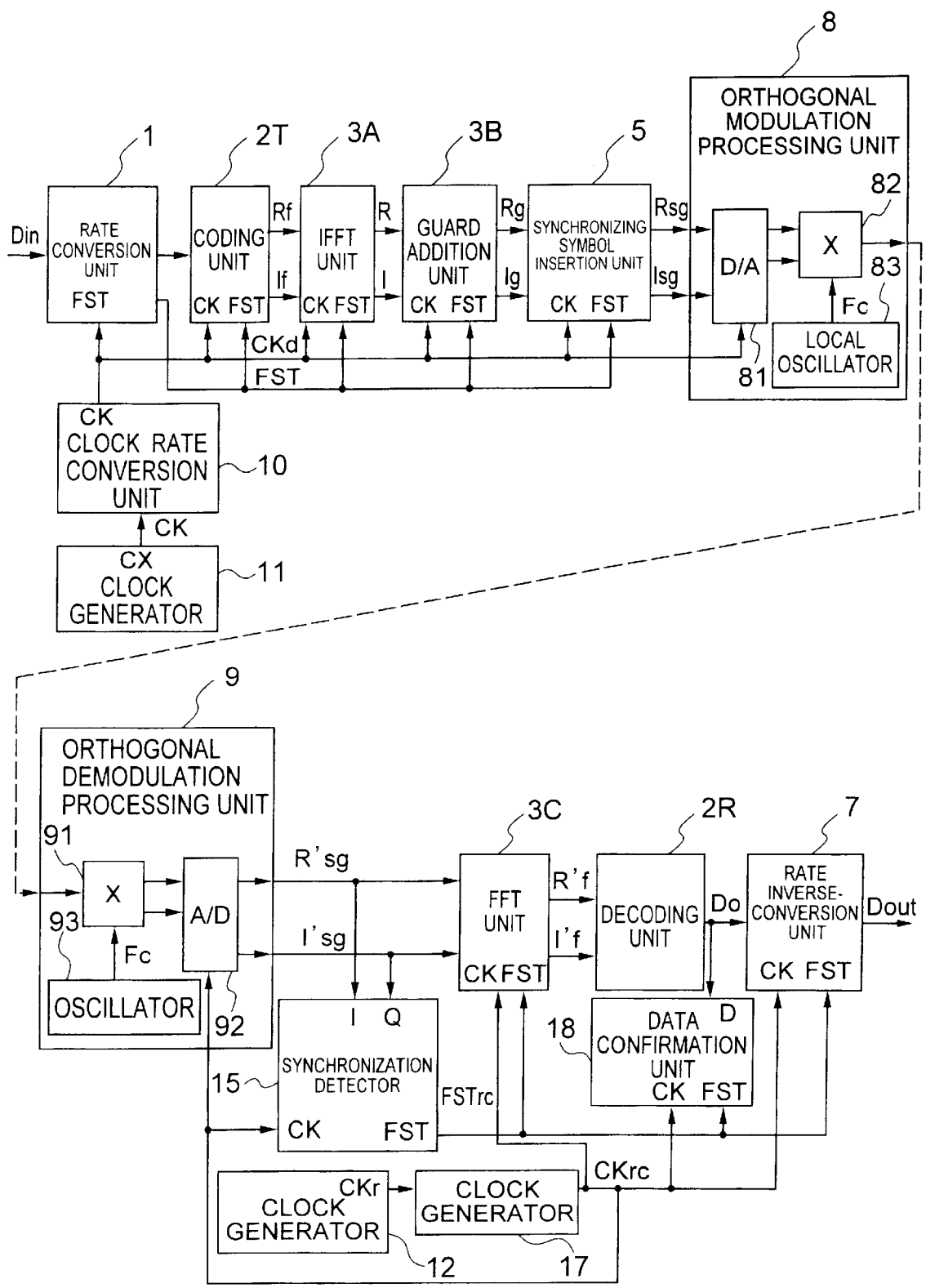
FIG. 29 is a block diagram schematically illustrating the overall configuration of an OFDM communication system according to a still further embodiment of the present invention.

FIG. 29 is a block diagram schematically illustrating a third embodiment of a bandwidth changeable transmission system using change of the clock frequency. The embodiment of FIG. 29 includes the rate conversion unit 17 and the data confirmation unit 18 in addition to the configuration of FIG. 25 and description of operation thereof is omitted.

The clock rate conversion units 10 and 17 have only the function for changing the clock rate to a half, a third, a fourth or the like by only the frequency division operation using logic elements. This configuration is mainly used when the clock rate can change only in the range that the change width of frequency of the voltage controlled clock oscillator 12 at the receiving side is narrow.

Figure 30:
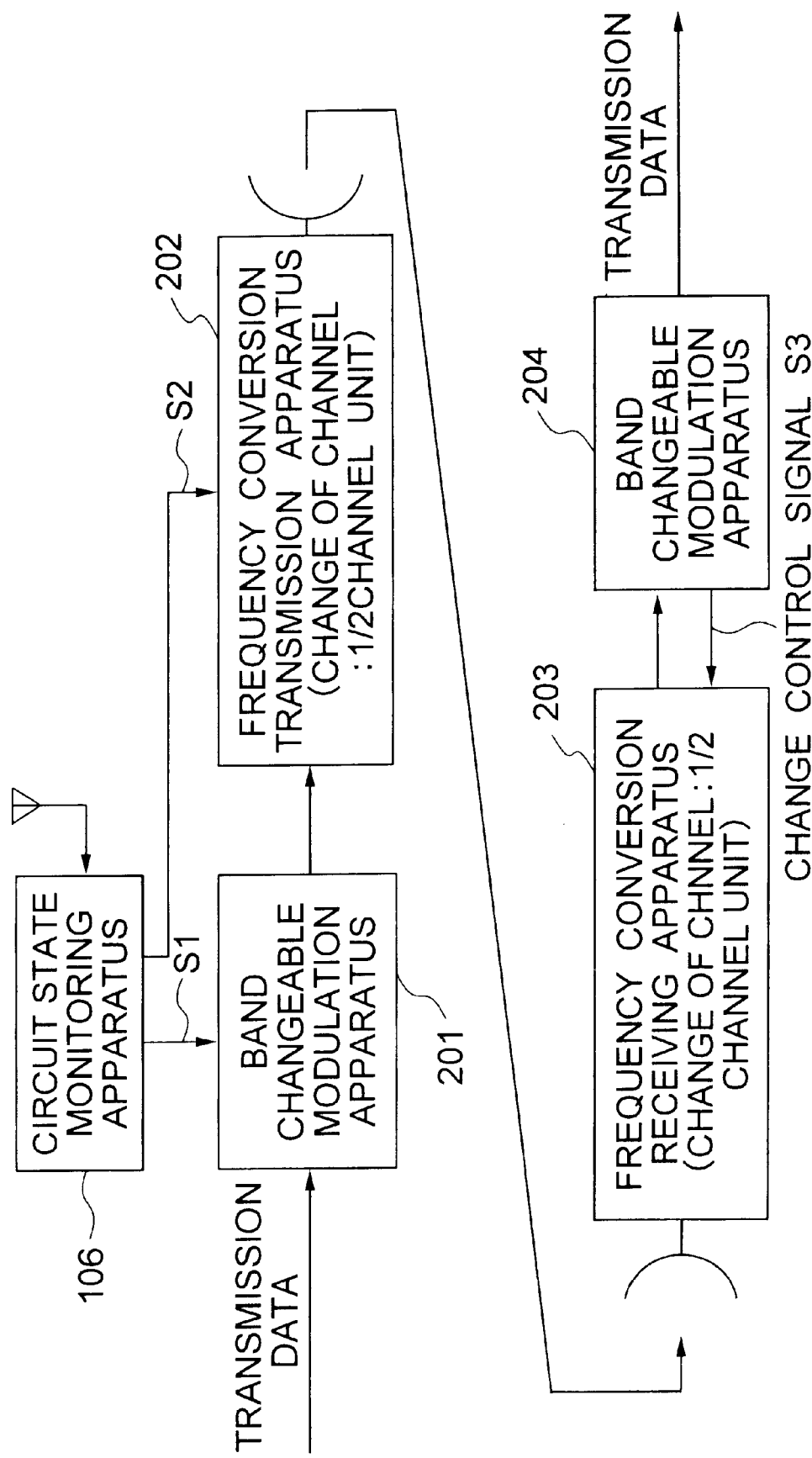
FIG. 30 is a block diagram schematically illustrating the overall configuration of an embodiment of an automatic bandwidth changeable transmission system to which the present invention is applied.

FIG. 30 schematically illustrates an automatic bandwidth changeable transmission system to which the present invention is applied.

A circuit state monitoring apparatus 106 examines the use state of electric wave in a circuit to be used and determines a frequency to be used and a usable bandwidth in accordance with the empty state thereof and is configured as shown in FIG. 24. The monitoring apparatus 106 produces a change control signal S1 to be supplied to a control terminal of a bandwidth changeable modulation apparatus 201. Further, the monitoring apparatus 106 produces a change control signal S2 to be supplied to a control terminal of a frequency conversion transmission apparatus 202.

The bandwidth changeable modulation apparatus 201 and the frequency conversion transmission apparatus 202 constitute in large blocks the transmission side shown in FIGS. 25, 28 and 29 and the bandwidth changeable modulation apparatus 201 corresponds to the rate conversion unit 1 to the synchronizing symbol insertion unit 5 while the frequency conversion transmission apparatus 202 corresponds to the orthogonal modulation processing unit 8. The apparatuses include the function for capable of controlling the change externally.

Further, a bandwidth changeable demodulation apparatus 204 sends to a frequency conversion reception apparatus 203 a change control signal S3 from the demodulation state such as the presence of carriers.

The frequency conversion reception apparatus 203 and the bandwidth changeable demodulation apparatus 204 constitute in large blocks the receiving side shown in FIGS. 25, 28 and 29 and the frequency conversion reception apparatus 203 corresponds to the orthogonal demodulation processing unit 9. The bandwidth changeable demodulation apparatus 204 corresponds to the FFT unit 3 to the rate inverse-conversion unit 7.

Operation of the system is now described.

Prior to the start of transmission, the circuit state monitoring apparatus 206 at the transmission side examines the use state of electric wave for a circuit to be used and determines a frequency to be used and a usable bandwidth in accordance with the empty state of the circuit.

The bandwidth to be used is designated to the bandwidth changeable modulation apparatus 201 by means of the change control signal S1 and the frequency to be used is designated to the frequency conversion transmission apparatus 202 by means of the change control signal S2.

The bandwidth changeable modulation apparatus 201 changes the clock rate as described above so that the bandwidth to be used is set. Further, the frequency conversion transmission apparatus 202 controls the local oscillation frequency so that the frequency of the clock is set to the frequency to be used. Thus, the transmission signal having the frequency to be used and the bandwidth to be used is transmitted to the receiving side.

On the other hand, the bandwidth changeable modulation apparatus 204 at the receiving side decides whether the current state corresponds to any of the state that all carriers are present, the state that only part of carriers are present and the approximately expected carriers are present and produces the change control signal S3 corresponding to the decided state to be supplied to the frequency conversion reception apparatus 203.

The frequency conversion reception apparatus 203 changes the reception frequency in accordance with the change control signal S3 so that the apparatus 203 can receive the transmission signal from the transmission side.

As described above, there can structure the system which automatically search for an empty channel and performs data transmission with the transmission bandwidth corresponding to the empty bandwidth.

Figure 31:
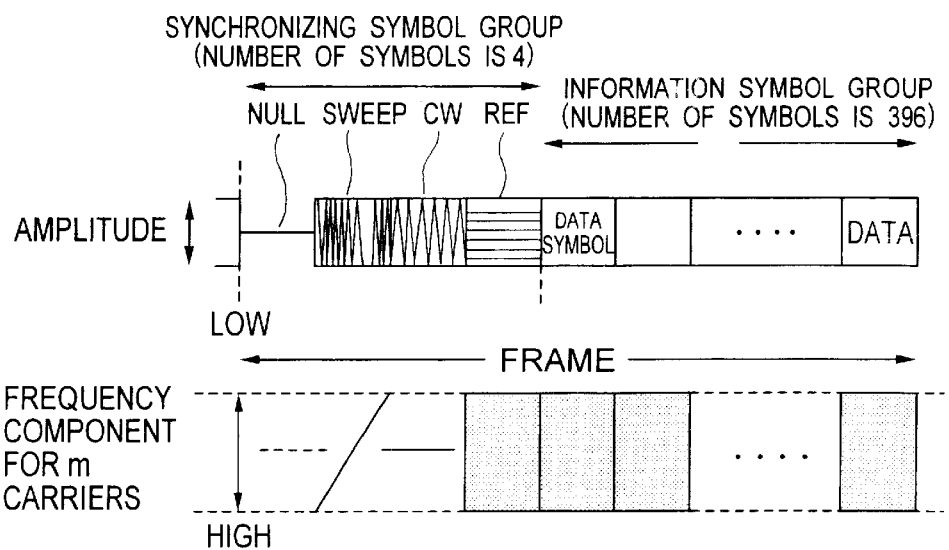
FIG. 31 shows a relation of a frame period time and frequency component in case where the clock rate is equal to one time of the original frequency.

FIG. 31 shows a relation of the frame period time in case where the clock rate is set to one time and the frequency component in this case. Further, FIG. 32 shows a relation of the frame period time in case where the clock rate is increased and the frequency component in this case.

As described above, when the clock rate is reduced to a half, the frame period is increased to two times but the frequency bandwidth is reduced to a half.

Figure 32:
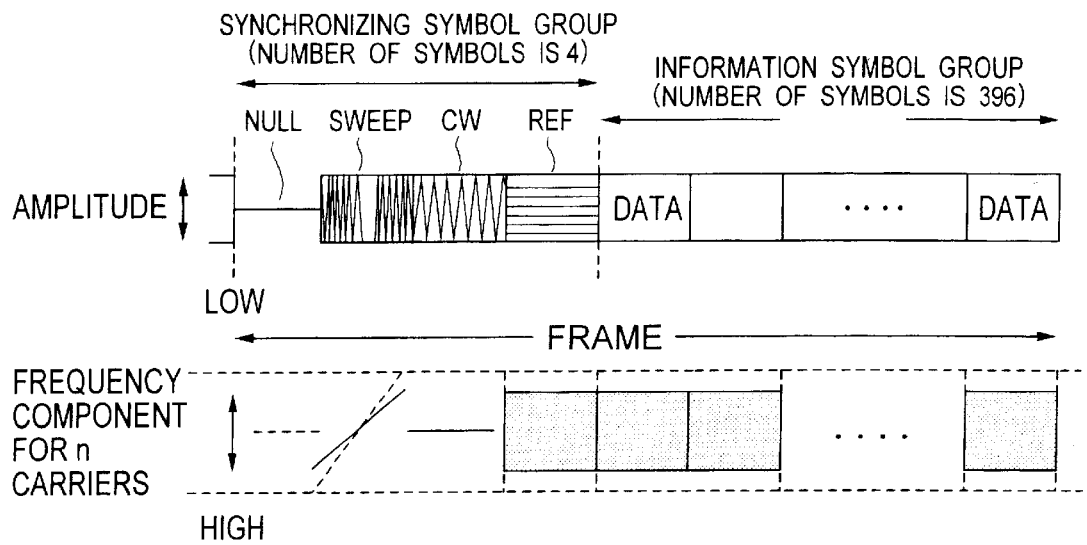
FIG. 32 shows a relation of the frame period time and the frequency component in an increased clock rate.

Accordingly, the bandwidth for one channel can be utilized in the case of FIG. 31 and another channel can be utilized in the case of FIG. 32.

Namely, in the transmission system shown in FIG. 30, there can be combined the frequency conversion transmission apparatus 202 and the frequency conversion reception apparatus 203 which can change the transmission and reception frequencies in a half channel unit.

Thus, the bandwidth of one channel can be utilized for a plurality of transmissions, so that a limited transmission bandwidth can be utilized effectively.

According to the embodiment described above, there can be realized the system in which the clock rate can be changed at the transmission side to thereby change the bandwidth and the receiving side can follow the change automatically.

What is claimed is:

1. A communication method in an orthogonal frequency division multiplexing modulation communication system, comprising the steps of:

changing, in a transmission apparatus, a setting of frequency bandwidth of a signal which was modulated in accordance with an orthogonal frequency division multiplexing modulation method to a predetermined bandwidth within a bandwidth allocated to said communication system;

transmitting said modulated signal; and receiving, in a receiving apparatus, said modulated transmission signal and changing a setting of demodulation frequency bandwidth of said received signal to follow the change of said frequency bandwidth of said modulated signal, wherein the setting change of said frequency bandwidth of said modulated signal is made by changing the number of carriers of said transmission signal, and wherein said changing step of the number of carriers includes the steps of:

changing an amount of input data per unit time in said transmission apparatus, changing an effective data period of said modulated signal, changing a pattern of a synchronization signal added to said modulated signal, and changing a transmission signal level to satisfy a transmission condition.

2. A communication method according to claim 1, comprising performing, in accordance with the change of the number of carriers in said transmission apparatus, the steps of:

changing a reference signal pattern for synchronization detection in said receiving apparatus to detect the synchronizing signal from said received signal;

changing an effective data period of a signal obtained by decoding said received signal; and changing a taking-in period of data component in said effective data period.

3. A communication method according to claim 1, wherein the number of carrier signals is detected from said received signal and when it is detected that the number of carriers is changed, a control signal for indicating change of a reference signal pattern for synchronization detection in said receiving apparatus, change of an effective data period of a signal obtained by decoding said received signal, and change of a taking-in period of data component in said effective data period is produced.

4. A communication method according to claim 1, further comprising the steps of:
producing a control signal for changing the setting of frequency bandwidth of said transmission signal to a predetermined bandwidth; and
changing the setting of frequency bandwidth of said signal modulated in accordance with the orthogonal frequency division multiplexing modulation method in accordance with said control signal.

5. A communication method in an orthogonal frequency division multiplexing modulation communication system, comprising the steps of:
changing, in a transmission apparatus, a setting of frequency bandwidth of a signal which was modulated in accordance with an orthogonal frequency division multiplexing modulation method to a predetermined bandwidth within a bandwidth allocated to said communication system;
transmitting said modulated signal; and
receiving, in a receiving apparatus, said modulated transmission signal and changing a setting of demodulation frequency bandwidth of said received signal to follow the change of said frequency bandwidth of said modulated signal,
wherein the setting change of said frequency bandwidth of said modulated signal is made by changing a frequency of a clock signal in said transmission apparatus, and
wherein the setting change of said frequency bandwidth of said modulated signal is detected based on said received signal and a frequency of a clock signal in said receiving apparatus is changed in accordance with the detected change of said frequency bandwidth to thereby change said demodulation frequency bandwidth.

6. A communication method according to claim 5, wherein said modulated signal includes a synchronizing signal and said synchronizing signal is detected from said received signal, a phase of said detected synchronizing signal being compared with a phase of a reference signal prepared on the basis of a current clock signal in said receiving apparatus so that said frequency of said clock signal in said receiving apparatus is changed in accordance with a phase difference.

7. A communication method according to claim 5, wherein when an interval between adjacent carrier signals of said modulated signal is changed in accordance with the change of said frequency of said clock signal in said transmission apparatus and said received signal is decoded, omission of said carrier signals is detected and said frequency of said clock signal in said receiving apparatus is controlled to dissolve the omission of said carrier signals.

8. A communication method according to claim 7, wherein said changing step of said frequency of said clock signal in said receiving apparatus includes the steps of changing said frequency by a first change amount and a step of changing said frequency by a second change amount smaller than said first change amount.

9. A communication method according to claim 6, comprising controlling a phase of said clock signal together with the change of said frequency of said clock signal in said receiving apparatus.

10. A communication method according to claim 5, further comprising the steps of:
producing a control signal for changing said frequency bandwidth of said signal to be transmitted; and
changing said setting of frequency bandwidth of said signal modulated with the orthogonal frequency division multiplexing modulation method in accordance with said control signal.

11. A communication method according to claim 1, wherein said orthogonal frequency division multiplexing modulation system is a digital modulation system for at least one wave of carriers being a quadrature amplitude modulation system.

12. A transmission method in an orthogonal frequency division multiplexing modulation communication system, comprising the steps of:
changing a setting of frequency bandwidth of a signal which was modulated in accordance with an orthogonal frequency division multiplexing modulation method to a predetermined bandwidth within a bandwidth allocated to said communication system by changing the number of carriers of said signal; and
transmitting said modulated signal,
wherein said changing step of said number of carriers includes the steps of:
changing an amount of input data per unit time in said transmission apparatus,
changing an effective data period of said modulated signal,
changing a pattern of a synchronizing signal added to said modulated signal, and
changing a transmission signal level to satisfy a transmission condition.

13. A receiving method in an orthogonal frequency division multiplexing modulation communication system, comprising the steps of:
receiving, in a receiving apparatus, an orthogonal frequency division multiplexing modulated signal having a changed bandwidth; and
changing a demodulation frequency bandwidth of said received signal to follow change of a frequency bandwidth of said modulated signal;
said changing step of said demodulation frequency bandwidth further including the steps of:
changing a reference signal pattern for synchronization detection in said receiving apparatus to detect a synchronizing signal from said received signal;
changing an effective data period of a signal obtained by decoding said received signal and
changing a taking-in period of data component in said effective data period.

14. A receiving method according to claim 13, wherein the number of carriers is detected from said received signal and when it is detected that the number of carriers is changed, a control signal for indicating change of said reference signal pattern for synchronization detection in said receiving apparatus, change of said effective data period of a signal obtained by decoding said received signal, and change of said taking-in period of the data component in said effective data period is produced.

15. A receiving method in an orthogonal frequency division multiplexing modulation communication system, comprising the steps of:
receiving, in a receiving apparatus, an orthogonal frequency division multiplexing modulated signal having a changed bandwidth; and changing a demodulation frequency bandwidth of said received signal to follow change of a frequency bandwidth of said modulated signal;

said changing step of said demodulation frequency bandwidth further including the steps of:

detecting a synchronizing signal from said received signal, comparing a phase of said detected synchronizing signal with a phase of a reference signal prepared on the basis of a current clock signal in said receiving apparatus, and changing a frequency of the clock signal in said receiving apparatus in accordance with a phase difference.

16. A receiving method according to claim 15, wherein when an interval between adjacent carrier signals of said modulated signal is changed in accordance with change of a frequency of a clock signal in a transmission apparatus, omission of said carrier signals is detected when said received signal is decoded and said frequency of said clock signal in said receiving apparatus is controlled to dissolve the omission of said carrier signals.

17. An orthogonal frequency division multiplexing modulation communication apparatus comprising:

a transmission apparatus for changing a setting of frequency bandwidth of a signal modulated in accordance with an orthogonal frequency division multiplexing modulation system and transmitting the modulated signal;

a receiving apparatus for receiving said modulated signal and changing a demodulation frequency bandwidth of the received signal to follow the change of said frequency bandwidth of said modulated signal; and means for changing the number of carriers of said modulated signal to thereby change said frequency bandwidth, wherein said transmission apparatus comprises:

a data rate conversion unit for converting successively inputted data into data arrangement of frame unit constituted by a predetermined number of symbols, a coding unit for coding a signal supplied from said data rate conversion unit, an inverse Fourier transform unit for transforming the coded signal into a time-axis base signal, a synchronizing symbol insertion unit for inserting a synchronizing symbol into the inverse Fourier transformed signal every predetermined symbol period, and an orthogonal modulation processing unit for orthogonally modulating said synchronizing symbol inserted signal, wherein said means for changing the number of carriers includes:

means for changing an input data amount per unit time in said data rate conversion unit, changing an effective data period of said modulated signal in said coding unit, and changing a pattern of said synchronizing symbol added to the signal in said synchronizing symbol insertion unit.

18. An orthogonal frequency division multiplexing modulation communication apparatus according to claim 17, wherein said receiving apparatus comprises an orthogonal demodulation processing unit for orthogonally demodulating the received signal, a Fourier transform unit for transforming the demodulated signal into a frequency-axis base signal, a decoding unit for decoding the Fourier transformed signal, a data rate inverse-conversion unit for converting the decoded signal into successive data, a synchronization detection unit for detecting a synchronizing symbol from the received signal, and a control unit, which changes a pattern of a reference signal for detection of said synchronizing symbol, changes an effective data period of the decoded signal in said decoding unit, and changes a taking-in period of data component in said data rate inverse-conversion unit in accordance with the change of the number of carriers in said transmission apparatus.

19. An orthogonal frequency division multiplexing modulation communication apparatus according to claim 17, wherein said receiving apparatus comprises an orthogonal demodulation processing unit for orthogonally demodulating the received signal, a Fourier transform unit for transforming the demodulated signal into a frequency-axis base signal, a decoding unit for decoding the Fourier transformed signal, a data rate inverse-conversion unit for converting the decoded signal into successive data, a synchronization detection unit for detecting a synchronizing symbol from the received signal, a data confirmation unit for detecting the number of carrier signals from the Fourier transformed signal, and a control unit, which produces a control signal for changing a pattern of a reference signal for detection of said synchronizing symbol, changing an effective data period of the decoded signal in said decoding unit, and changing a taking-in period of data component in said data rate inverse-conversion unit when said data confirmation unit detects that the number of carriers is changed.

20. An orthogonal frequency division multiplexing modulation communication apparatus according to claim 18 or 19, wherein said transmission apparatus further comprises transmission level changing means for adjusting a level of the transmission signal in accordance with the change of the number of carriers and changing a gain of said coding unit or said inverse Fourier transform unit by an inverse number of a value multiplied by a square root of a change rate of the number of carriers and said receiving apparatus further comprises reception level changing means for adjusting a level of the received signal in accordance with the change of the number of carriers and for changing a gain of said Fourier transform unit or said decoding unit by an inverse number of a value multiplied by a square root of the change rate of the number of carriers.

21. An orthogonal frequency division multiplexing modulation communication apparatus according to claim 17, wherein the change of the number of carriers is made each symbol of said modulated signal.

22. An orthogonal frequency division multiplexing modulation communication apparatus comprising:

a transmission apparatus for changing a setting of frequency bandwidth of a signal modulated in accordance with an orthogonal frequency division multiplexing modulation system and transmitting the modulated signal;

a receiving apparatus for receiving said modulated signal and changing a demodulation frequency bandwidth of the received signal to follow the change of said frequency bandwidth of said modulated signal; and a monitoring apparatus for monitoring a state of a communication path and producing a control signal for changing the frequency bandwidth of the signal to be transmitted, and wherein said transmission apparatus changes the frequency bandwidth of the signal modulated by the orthogonal frequency division multiplexing modulation system in accordance with said control signal.

23. An orthogonal frequency division multiplexing modulation communication apparatus comprising:

a transmission apparatus for changing a setting of frequency bandwidth of a signal modulated in accordance with an orthogonal frequency division multiplexing modulation system and transmitting the modulated signal;

a receiving apparatus for receiving said modulated signal and changing a demodulation frequency bandwidth of the received signal to follow the change of said frequency bandwidth of said modulated signal; and means for changing the frequency bandwidth by changing a frequency of a clock signal used in said transmission apparatus, wherein said transmission apparatus comprises:
  a data rate conversion unit for converting successively inputted data into data arrangement of frame unit constituted by a predetermined number of symbols,
  a coding unit for coding a signal supplied from said data rate conversion unit,
  an inverse Fourier transform unit for transforming the coded signal into a time-axis base signal,
  a synchronizing symbol insertion unit for inserting a synchronizing symbol into the inverse Fourier transformed signal every predetermined symbol period, and
  an orthogonal modulation processing unit for orthogonally modulating said synchronizing symbol inserted signal, and
  wherein said means for changing the frequency bandwidth includes:
    said data rate conversion unit,
    said coding unit,
    said inverse Fourier conversion unit,
    said synchronizing symbol insertion unit, and
    means for changing the frequency of the clock signal supplied to said orthogonal modulation processing unit.

24. An orthogonal frequency division multiplexing modulation communication apparatus according to claim 23, wherein said receiving apparatus comprises an orthogonal demodulation processing unit for orthogonally demodulating the received signal, a Fourier transform unit for transforming the demodulated signal into a frequency-axis base signal, a decoding unit for decoding the Fourier transformed signal, a data rate inverse-conversion unit for converting the decoded signal into successive data, a synchronization detection unit for detecting a synchronizing symbol from the received signal, a data confirmation unit for detecting change of the frequency bandwidth of the modulated signal on the basis of the decoded signal, a clock signal generation unit for supplying a clock signal to said orthogonal demodulation processing unit, said Fourier transform unit, said decoding unit, said data rate conversion unit, said synchronization detection unit and said data confirmation unit, and means for changing a frequency of the clock signal of said clock signal generation unit in accordance with detection of the change of the frequency bandwidth.

25. An orthogonal frequency division multiplexing modulation communication apparatus according to claim 24, wherein said receiving apparatus comprises a clock rate conversion unit for detecting said synchronizing symbol from the received signal and comparing a phase of said detected synchronizing symbol with a phase of a reference signal prepared on the basis of a current clock signal in said clock signal generation unit so that the frequency of the clock signal in said receiving apparatus is changed in accordance with a phase difference.

26. An orthogonal frequency division multiplexing modulation communication apparatus according to claim 24, wherein an interval between adjacent carrier signals of said modulated signal is changed by changing the frequency of the clock signal in said transmission apparatus and omission of said carrier signals in the decoded signal in said decoding unit of said receiving apparatus is detected, so that said changing means of said clock signal frequency controls the frequency of said clock signal generation unit so that omission of said carrier signals is dissolved.

27. An orthogonal frequency division multiplexing modulation communication apparatus according to claim 26, wherein said clock signal generation unit of said receiving apparatus includes a clock signal generator for changing the frequency by a first change amount and a second clock signal changing unit for further changing the clock frequency by a second change amount.

28. An orthogonal frequency division multiplexing modulation communication apparatus according to claim 23, further comprising:
  a monitoring apparatus for monitoring a state of a communication path and producing a control signal for changing the frequency bandwidth of the signal to be transmitted,
  wherein said transmission apparatus changes the frequency bandwidth of the signal modulated by the orthogonal frequency division multiplexing modulation system in accordance with said control signal from said monitoring apparatus.

29. An orthogonal frequency division multiplexing modulation communication apparatus according to claim 23, wherein said orthogonal frequency division multiplexing modulation system is a digital modulation system for at least one wave of carriers being a quadrature amplitude modulation system.

30. A transmission apparatus for an orthogonal frequency division multiplexing modulated signal, comprising:
  a data rate conversion unit for converting successively inputted data into data arrangement of frame unit constituted by a predetermined number of symbols;
  a coding unit for coding a signal supplied from said data rate conversion unit;
  an inverse Fourier transform unit for transforming the coded signal into a time-axis base signal;
  a synchronizing symbol insertion unit for inserting a synchronizing symbol into the inverse Fourier transformed signal every predetermined symbol period;
  an orthogonal modulation processing unit for orthogonally modulating said synchronizing symbol inserted signal; and
  means for changing an input data amount per unit time in said data rate conversion unit, changing an effective data period of said modulated signal in said coding unit, and changing a pattern of said synchronizing symbol added to the signal in said synchronizing symbol insertion unit to thereby control the number of carriers of a transmission signal to change a frequency bandwidth of the transmission signal.

31. A transmission apparatus for an orthogonal frequency division multiplexing modulated signal, comprising:
  a data rate conversion unit for converting successively inputted data into data arrangement of frame unit constituted by a predetermined number of symbols;
  a coding unit for coding a signal supplied from said data rate conversion unit;
  an inverse Fourier transform unit for transforming the coded signal into a time-axis base signal;

a synchronizing symbol insertion unit for inserting a synchronizing symbol into the inverse Fourier transformed signal every predetermined symbol period;

an orthogonal modulation processing unit for orthogonally modulating said synchronizing symbol inserted signal; and means for changing a frequency bandwidth in accordance with change of a frequency of a clock signal used in said transmission apparatus and including said data rate conversion unit, said coding unit, said inverse Fourier transform unit, said synchronizing symbol insertion unit and means for changing a frequency of a clock signal supplied to said orthogonal modulation processing unit.

32. A receiving apparatus for an orthogonal frequency division multiplexing modulated signal, comprising:

an orthogonal demodulation processing unit for receiving the orthogonal frequency division multiplexing modulated signal having a bandwidth changed by changing the number of carriers and orthogonally demodulating the received signal;

a Fourier transform unit for transforming the demodulated signal into a frequency-axis base signal;

a decoding unit for decoding the Fourier transformed signal;

a data rate inverse-conversion unit for converting the decoded signal into successive data;

a synchronization detection unit for detecting a synchronizing symbol from the received signal; and a control unit for changing a pattern of a reference signal for detection of said synchronizing symbol, changing an effective data period of the decoded signal in said decoding unit, and changing a taking-in period of data component in said data rate inverse-conversion unit in accordance with the change of the number of carriers.

33. A receiving apparatus for an orthogonal frequency division multiplexing modulated signal, comprising:

an orthogonal demodulation processing unit for receiving the orthogonal frequency division multiplexing modulated signal having a bandwidth changed by changing the number of carriers and orthogonally demodulating the received signal;

a Fourier transform unit for transforming the demodulated signal into a frequency-axis base signal;

a decoding unit for decoding the Fourier transformed signal;

a data rate inverse-conversion unit for converting the decoded signal into successive data;

a synchronization detection unit for detecting a synchronizing symbol from the received signal;

a data confirmation unit for detecting the number of carrier signals from the Fourier transformed signal; and a control unit for producing a control signal for changing a pattern of a reference signal for detection of said synchronizing symbol, changing an effective data period of the decoded signal in said decoding unit, and changing a taking-in period of data component in said data rate inverse-conversion unit when said data confirmation unit detects that the number of carriers is changed.

34. A receiving apparatus for an orthogonal frequency division multiplexing modulated signal, comprising:

an orthogonal demodulation processing unit for receiving the orthogonal frequency division multiplexing modulated signal having a changed bandwidth and orthogonally demodulating the received signal;

a Fourier transform unit for transforming the demodulated signal into a frequency-axis base signal;

a decoding unit for decoding the Fourier transformed signal;

a data rate inverse-conversion unit for converting the decoded signal into successive data;

a synchronization detection unit for detecting a synchronizing symbol from the received signal;

a data confirmation unit for detecting change of a frequency bandwidth of said modulated signal on the basis of the decoded signal;

a clock signal generating unit for supplying a clock signal to said orthogonal demodulation processing unit, said Fourier transform unit, said coding unit, said data rate conversion unit, said synchronization detection unit and said data confirmation unit; and means for changing a frequency of the clock signal of said clock signal generation unit in accordance with detection of the change of the frequency bandwidth.

* * * * *